US012664717B2

(12) United States Patent
Sandow et al.

(10) Patent No.: US 12,664,717 B2
(45) Date of Patent: **\*Jun. 23, 2026**

(54) MULTI-PERSPECTIVE MATERIAL VISUALIZATION SYSTEM

(71) Applicant: Material Technologies Corporation, New York, NY (US)

(72) Inventors: Adam I. Sandow, Boca Raton, FL (US); Kamal Farah, Boca Raton, FL (US)

(73) Assignee: Materia Group Corporation, Boca Raton, FL (US)

( \* ) Notice: Subject to any disclaimer, the term of this patent is extended or adjusted under 35 U.S.C. 154(b) by 453 days.

This patent is subject to a terminal disclaimer.

(21) Appl. No.: 18/210,842

(22) Filed: Jun. 16, 2023

(65) Prior Publication Data

US 2024/0420406 A1 Dec. 19, 2024

(51) Int. Cl.
*G06T 15/04* (2011.01)
*G06F 3/01* (2006.01)
*G06T 15/20* (2011.01)

(52) U.S. Cl.
CPC .............. *G06T 15/04* (2013.01); *G06F 3/011* (2013.01); *G06T 15/20* (2013.01); *G06T 2210/04* (2013.01)

(58) Field of Classification Search
None
See application file for complete search history.

(56) References Cited

U.S. PATENT DOCUMENTS

| | | | |
|---|---|---|---|
| 1,322,290 | A | 11/1919 | Cibulka |
| 1,856,634 | A | 5/1932 | Hartig |
| 1,922,354 | A | 8/1933 | Burke |

(Continued)

FOREIGN PATENT DOCUMENTS

| | | |
|---|---|---|
| CN | 202206470 | 4/2012 |
| DE | 102010007037 | 8/2011 |

(Continued)

OTHER PUBLICATIONS

International Search Report and Written Opinion for International Application No. PCT/US2020/049101 mailed Oct. 29, 2020, 6 pages.

(Continued)

*Primary Examiner* — Michael J Cobb
(74) *Attorney, Agent, or Firm* — Brownstein Hyatt Farber Schreck, LLP

(57) ABSTRACT

A multi-perspective visualization system determines one or more positions of one or more people, generates one or more models of one or more demonstration areas from one or more perspectives corresponding to the position, applies one or more digital materials to the model, splits the model into split images corresponding to projector zones, and provides the split images to projectors for the respective zones. If there are multiple people with multiple perspectives, the system may generate multiple versions of the model from different perspectives and configure images of the model to be projected in such a way that they are respectively viewable by the respective person that corresponds to the respective perspective from which the respective model was generated.

20 Claims, 34 Drawing Sheets
(5 of 34 Drawing Sheet(s) Filed in Color)

(56)  References Cited

U.S. PATENT DOCUMENTS

| | | | |
|---|---|---|---|
| 2,728,450 A | 12/1955 | Haire | |
| 2,771,237 A | 11/1956 | Philipson | |
| 2,822,973 A | 2/1958 | Armstrong | |
| 3,301,621 A | 1/1967 | Stephenson | |
| 3,991,902 A | 11/1976 | Ford, Jr. | |
| 4,067,493 A | 1/1978 | Stavin | |
| 4,290,524 A | 9/1981 | Azar | |
| 4,369,882 A | 1/1983 | Schluger | |
| 4,669,610 A | 6/1987 | Lindsey et al. | |
| 4,711,348 A | 12/1987 | Schluger | |
| 4,838,425 A | 6/1989 | O'Brien et al. | |
| 5,022,522 A | 6/1991 | Kennedy | |
| 5,209,349 A | 5/1993 | Porter et al. | |
| 5,716,075 A | 2/1998 | Evert, Jr. | |
| 5,762,191 A | 6/1998 | Etzion | |
| 6,112,900 A | 9/2000 | Adkins, Jr. | |
| 7,070,055 B2 | 7/2006 | Lechanoine et al. | |
| 7,264,123 B2 | 9/2007 | Reed | |
| 7,604,354 B1 | 10/2009 | Ligon | |
| 7,621,402 B2 | 11/2009 | Sandow | |
| 8,228,315 B1 | 7/2012 | Starner et al. | |
| 8,292,733 B2 | 10/2012 | Crawford et al. | |
| 8,295,555 B2 | 10/2012 | Campbell, Jr. et al. | |
| 8,564,622 B1 * | 10/2013 | Quinn | G06F 3/1438 |
| | | | 348/51 |
| 8,699,787 B2 | 4/2014 | Van Den Hengel | |
| 9,035,966 B2 | 5/2015 | Rice et al. | |
| 9,352,888 B2 | 5/2016 | Scott | |
| 9,365,337 B2 | 6/2016 | Fullan | |
| 9,429,421 B2 | 8/2016 | Kessler | |
| 9,631,773 B2 | 4/2017 | Gehlhausen | |
| 9,690,370 B2 | 6/2017 | Levesque et al. | |
| 10,475,250 B1 | 11/2019 | Huang | |
| 10,685,492 B2 | 6/2020 | Choi | |
| 10,872,322 B2 | 12/2020 | Siddique et al. | |
| 10,875,697 B2 | 12/2020 | Sandow | |
| 11,025,892 B1 * | 6/2021 | Aman | H04N 13/337 |
| 11,062,383 B2 * | 7/2021 | Holt | G06Q 30/0643 |
| 2004/0089579 A1 | 5/2004 | Berliner et al. | |
| 2007/0051651 A1 | 3/2007 | Marom | |
| 2009/0299960 A1 | 12/2009 | Lineberger | |
| 2010/0278761 A1 | 11/2010 | Samain | |
| 2010/0315825 A1 * | 12/2010 | Kawamura | H04N 9/3197 |
| | | | 362/458 |
| 2012/0128241 A1 | 5/2012 | Jung | |
| 2013/0342575 A1 | 12/2013 | Coon | |
| 2014/0375674 A1 | 12/2014 | Rice et al. | |
| 2016/0018970 A1 | 1/2016 | Chaudhri et al. | |
| 2016/0210602 A1 | 7/2016 | Siddique et al. | |
| 2017/0018094 A1 | 1/2017 | Todeschini | |
| 2017/0200314 A1 | 7/2017 | Jeong | |
| 2017/0330273 A1 | 11/2017 | Holt | |
| 2018/0329511 A1 * | 11/2018 | Aman | G06F 3/0308 |
| 2018/0374276 A1 * | 12/2018 | Powers | G06T 17/205 |
| 2019/0121522 A1 | 4/2019 | Davis | |
| 2020/0294316 A1 * | 9/2020 | Ikeda | G06F 3/0426 |
| 2020/0380762 A1 | 12/2020 | Karafin | |
| 2021/0067750 A1 | 3/2021 | Sandow | |
| 2021/0067752 A1 | 3/2021 | Sandow | |
| 2021/0400245 A1 * | 12/2021 | Sandow | G06Q 30/0241 |

FOREIGN PATENT DOCUMENTS

| | | |
|---|---|---|
| JP | 2019053450 | 4/2019 |
| WO | WO 11/015672 | 2/2011 |
| WO | WO 19/106095 | 6/2019 |

OTHER PUBLICATIONS

International Search Report and Written Opinion for International Application No. PCT/US2021/049616 mailed Dec. 23, 2021, 14 pages.

* cited by examiner

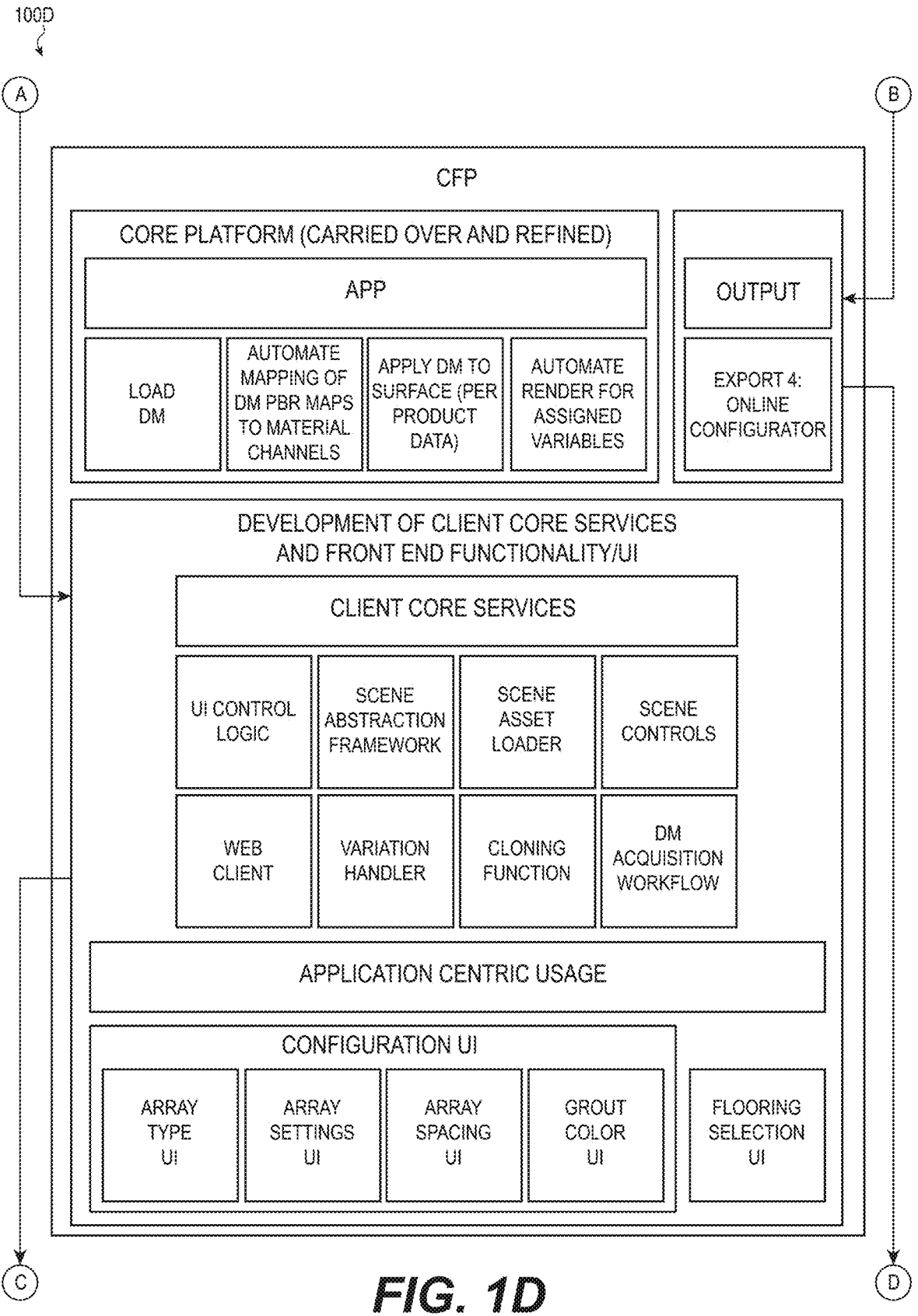

100D (A)                                                                                      (B)

CFP

CORE PLATFORM (CARRIED OVER AND REFINED)

APP

| LOAD DM | AUTOMATE MAPPING OF DM PBR MAPS TO MATERIAL CHANNELS | APPLY DM TO SURFACE (PER PRODUCT DATA) | AUTOMATE RENDER FOR ASSIGNED VARIABLES |

OUTPUT

EXPORT 4: ONLINE CONFIGURATOR

DEVELOPMENT OF CLIENT CORE SERVICES AND FRONT END FUNCTIONALITY/UI

CLIENT CORE SERVICES

| UI CONTROL LOGIC | SCENE ABSTRACTION FRAMEWORK | SCENE ASSET LOADER | SCENE CONTROLS |

| WEB CLIENT | VARIATION HANDLER | CLONING FUNCTION | DM ACQUISITION WORKFLOW |

APPLICATION CENTRIC USAGE

CONFIGURATION UI

| ARRAY TYPE UI | ARRAY SETTINGS UI | ARRAY SPACING UI | GROUT COLOR UI | FLOORING SELECTION UI |

| SCAN PHYSICAL SAMPLE | ~210A |

| NORMALIZE INFLUENCE OF LIGHT COLOR | ~220A |

| GENERATE TEXTURE STACK | ~230A |

| RECORD METADATA | ~240A |

| POST-PROCESS | ~250A |

200B

TEXTURE STACK

ALPHA (OPACITY)

DISPLACEMENT (BUMP, HEIGHT)

ROUGHNESS (OPPOSITE OF GLOSSINESS)

METALLIC (METALNESS)

NORMAL

BASE COLOR (ALBEDO)

200C

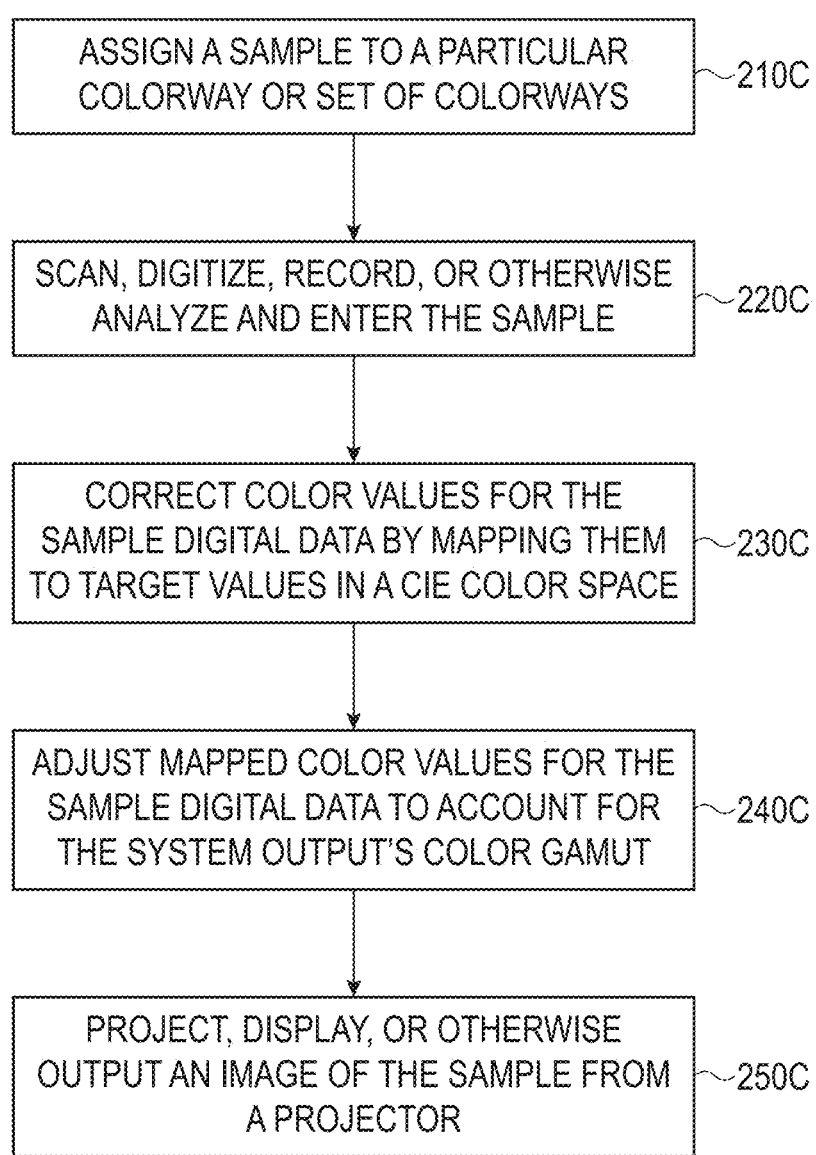

| ASSIGN A SAMPLE TO A PARTICULAR COLORWAY OR SET OF COLORWAYS | ~210C |

| SCAN, DIGITIZE, RECORD, OR OTHERWISE ANALYZE AND ENTER THE SAMPLE | ~220C |

| CORRECT COLOR VALUES FOR THE SAMPLE DIGITAL DATA BY MAPPING THEM TO TARGET VALUES IN A CIE COLOR SPACE | ~230C |

| ADJUST MAPPED COLOR VALUES FOR THE SAMPLE DIGITAL DATA TO ACCOUNT FOR THE SYSTEM OUTPUT'S COLOR GAMUT | ~240C |

| PROJECT, DISPLAY, OR OTHERWISE OUTPUT AN IMAGE OF THE SAMPLE FROM A PROJECTOR | ~250C |

GENERATE MODEL OF DEMONSTRATION AREA FROM VIEWPOINT ~410

APPLY SELECTED DIGITAL MATERIAL(S) TO SURFACE(S) OF MODEL ~420

ADJUST MODEL FOR DEMONSTRATION AREA CONDITION(S) ~430

SPLIT APPLIED MODEL INTO IMAGES FOR PROJECTOR ZONES ~440

PROVIDE RESPECTIVE IMAGES TO RESPECTIVE PROJECTORS ~450

600

700A

700B

700C

700D

800

RECEIVE SURFACE SELECTION ~801

PRESENT DIGITAL MATERIALS FOR SURFACE ~802

RECEIVE DIGITAL MATERIAL SELECTION ~803

APPLY DIGITAL MATERIAL TO MODEL FOR DEMONSTRATION AREA ~804

SPLIT APPLIED MODEL INTO IMAGES FOR PROJECTORS ~805

PROJECT ~806

807 ~ RECEIVE ORDER?

YES → ORDER PHYSICAL MATERIAL CORRESPONDING TO DIGITAL MATERIAL ~808

NO

YES ← MODIFY? ~809

NO

END ~810

900

170

105

920

921

1122

1125
1124
1123
1126

1200

105

1212

WEB
SERVER

1300

1500

315

313B

313A

313C

314

1522

1520

1521

1600

DETECT POSITION ~1610

GENERATE MODEL FROM VIEWPOINT ~1620

APPLY DIGITAL MATERIAL ~1630

ADJUST MODEL ~1640

SPLIT ~1650

PROVIDE TO PROJECTORS ~1660

YES   MOVE? ~1670

NO

1700

315    313B 313A    313C

314

1720A    1721A    1722A    1722B    1721B    1720B

1700

1800

DETERMINE POSITIONS  ~1810

GENERATE MODELS FROM VIEWPOINTS  ~1820

APPLY DESIGN MATERIALS  ~1830

ADJUST MODELS  ~1840

SPLIT  ~1850

PROVIDE VERSIONS OF MODELS TO PROJECTORS  ~1860

MOVE?  ~1870

NO

YES

1880~ UPDATE ONE OR MORE VERSIONS OF MODELS FOR MOVEMENT

MULTI-PERSPECTIVE MATERIAL VISUALIZATION SYSTEM

FIELD

The described embodiments relate generally to visualization systems. More particularly, the present embodiments relate to multi-perspective design material visualization systems.

BACKGROUND

Manufacturers and suppliers of design materials (such as fabrics, floorings, paints, wood, paneling, stone, brick, carpet, laminates, countertops, cabinets, wallpaper, molding, tiles, housewares, and so on) often present images of their materials for advertising purposes. For example, the design materials may be advertised to potential clients such as designers (e.g., interior designers, exterior designers, and so on) as well as end users (e.g., homeowners, businesses, and so on). Images of the materials may be displayed in print, such as industry magazines, showroom booklets, conference materials, and so on. Images of the materials may also be displayed on a website, such as a manufacturer website, a supplier website, and so on. In some instances, videos including the design materials may be presented. For example, a manufacturer or supplier of a design material may present a promotional video of their design materials to potential clients in a showroom.

Potential clients may use images of design materials as part of a design process related to the design materials, as part of making purchasing and/or other acquisition decisions related to the design materials, and so on. The images may be the most complete information that the potential clients have for making design process decisions related to the design materials, making purchasing and/or other acquisition decisions related to the design materials, and so on. Without sufficient information, it may be challenging for potential clients to make design process decisions related to the design materials, make purchasing and/or other acquisition decisions related to the design materials, and so on.

As an alternative, potential clients may visit locations (such as showrooms, conferences, and so on) where physical samples of design materials are available. For example, potential clients may obtain physical samples of different design materials and place them next to each other to evaluate potential designs that may include the different design materials. Similar to the images discussed above, potential clients may use such physical samples of design materials as part of a design process related to the design materials, as part of making purchasing and/or other acquisition decisions related to the design materials, and so on.

OVERVIEW

The present disclosure relates to a multi-perspective visualization system. The system may determine one or more positions of one or more people, generate one or more models of one or more demonstration areas from one or more perspectives corresponding to the position, apply one or more digital materials to the model, split the model into split images corresponding to projector zones, and provide the split images to projectors for the respective zones. If there are multiple people with multiple perspectives, the system may generate multiple versions of the model from different perspectives and configure images of the model to be projected in such a way that they are respectively viewable by the respective person that corresponds to the respective perspective from which the respective model was generated.

In various embodiments, a system includes a non-transitory storage medium that stores instructions and a processor. The processor executes the instructions to detect a position of a person, generate a model of a demonstration area from a viewpoint corresponding to the position of the person, apply a selected digital material to a model surface of the model that corresponds to a demonstration surface of the demonstration area, adjust the model for a demonstration area condition; split the model into split images for projector zones; and provide the split images to projectors that correspond to the projector zones.

In some examples, the processor detects the position of the person using a radio frequency identification tag. In a number of implementations of such examples, the radio frequency identification tag is coupled to glasses worn by the person.

In various examples, the processor detects the position of the person using a camera. In some examples, the processor detects the position of the person using a motion sensor. In a number of examples, the processor detects the position by receiving an indication of the position via user input.

In some examples, the processor detects that the person moves to a new position, generates updated split images based on the new position, and provides the updated split images to the projectors that correspond to the projector zones.

In some embodiments, a system includes a non-transitory storage medium that stores instructions and a processor. The processor executes the instructions to detect positions of multiple people, generate versions of a model of a demonstration area from viewpoints corresponding to the positions of the multiple people, apply a selected digital material to a model surface of the versions of the model that corresponds to a demonstration surface of the demonstration area, adjust the versions of the model for a demonstration area condition, split the versions of the model into split images for projector zones, configure the split images to be respectively viewable by the respective person of the multiple people, and provide the split images to projectors that correspond to the projector zones.

In a number of examples, the processor configures the split images to be respectively viewable by the respective person of the multiple people by polarizing the split images differently for the respective person of the multiple people. In some implementations of such examples, the system further includes glasses worn by the respective person of the multiple people that are polarized to match a polarization of the respective split images.

In various examples, the processor configures the split images to be respectively viewable by the respective person of the multiple people providing the split images in alternating frames. In some implementations of such examples, the system further includes glasses worn by the respective person of the multiple people that are polarized to match the frames of the respective split images.

In a number of examples, the processor applies a different digital material to the model surface of one of the versions of the model. In some examples, the processor provides different split images corresponding to different versions of the model to different sets of projectors.

In a number of embodiments, a system includes a non-transitory storage medium that stores instructions and a processor. The processor executes the instructions to generate a model of a demonstration area from a viewpoint corresponding to a position of a person, apply a selected digital material to a model surface of the model that corresponds to a demonstration surface of the demonstration area, split the model into split images for projector zones, provide the split images to projectors that correspond to the projector zones, generate updated split images based on a new position of the person, and provide the updated split images to the projectors that correspond to the projector zones.

In various examples, the processor receives the position of the person. In some examples, the processor detects the new position of the person. In a number of examples, the processor receives an indication of the selected digital material from the person.

In some examples, the selected digital material includes at least one of a fabric, a flooring, a paint, a wood, a paneling, a stone, a brick, a carpet, a laminate, a countertop, a cabinet, a wallpaper, a molding, a tile, or a houseware. In various examples, the processor at least one of polarizes the split images or alternates frames with the split images and other split images.

BRIEF DESCRIPTION OF THE DRAWINGS

The disclosure will be readily understood by the following detailed description in conjunction with the accompanying drawings, wherein like reference numerals designate like structural elements. The patent or application file contains at least one drawing executed in color. Copies of this patent or patent application publication with color drawing(s) will be provided by the Office upon request and payment of the necessary fee.

FIGS. 1C-1E depict an automated rendering pipeline.

FIG. 2C is a flowchart illustrating a sample method for calibration of a system output. This method may be performed by the system of FIG. 1.

DETAILED DESCRIPTION

Figure 1A:
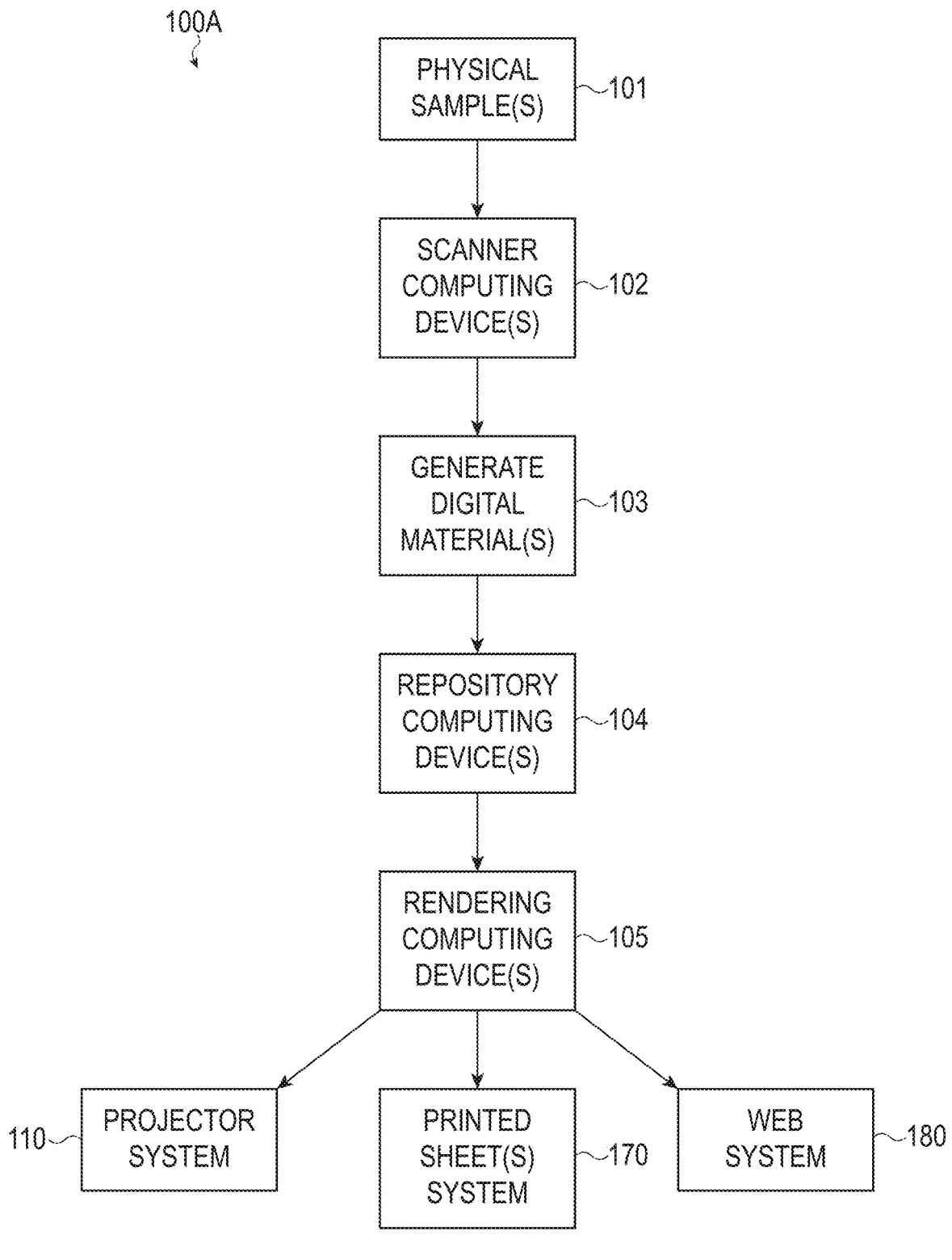
FIG. 1A depicts a first example system for material visualization.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

Using images or physical samples of design materials as part of a design process related to the design materials, as part of making purchasing and/or other acquisition decisions related to the design materials, and so on may present challenges as this may not convey how the actual design materials will appear, behave, and/or integrate with other actual design materials in a design. Without such information, final designs may drift away from the concept that was originally planned.

For example, people picking countertops, cabinets, flooring, and other design materials for a new house may visit a design center where images of design materials and/or physical samples of design materials may be available. The people may place the images and/or physical samples next to each other to see how the design materials selected for one aspect of the new house integrate with design materials selected for other aspects of the new house, particularly those that will be located in the same design area or design space. However, this may require the people to use their imaginations to visualize the images and/or physical samples in their final form (such as a sample rectangle of granite countertop versus an actual countertop made of that granite), and does not take into account any impact that lighting, time of day, and/or other conditions of the design area into which the design materials will be placed might have on how design materials will appear, behave, and/or integrate with other design materials.

By way of an alternative, an image of a design area may be generated and image editing software may be used to apply images of design materials to part and/or all of one or more of the surfaces of one of the walls, floor, and/or other objects in the design area (such as one or more counters, cabinets, tables and/or other furniture items, and so on). However, this may also not take into account any impact that lighting, time of day, and/or other conditions of the design area into which the design materials will be placed might have on how design materials will appear, behave, and/or integrate with other design materials. Further, the images of the design materials may not be "true to life" regarding the color, substance, scale, and/or other features of the respective design material. Even if the image of the design material is of a particular physical example of the design material, the image of the design material may not sufficiently correspond to a version of the design material that can be purchased and/or otherwise obtained.

In another alternative, a physical model of a design area may be constructed and one or more projectors may be used to project one or more images of design materials onto part and/or all of one or more of the surfaces of one of the walls, floor, and/or other objects in the design area (such as one or more counters, cabinets, tables and/or other furniture items, and so on). However, like the example above, this may also not take into account any impact that lighting, time of day, and/or other conditions of the design area into which the design materials will be placed might have on how design materials will appear, behave, and/or integrate with other design materials. Further, like the above, the images of the design materials may not be "true to life" regarding the color, substance, scale, and/or other features of the respective design material. Additionally, like the above, even if the image of the design material is of a particular physical example of the design material, the image of the design material may not sufficiently correspond to a version of the design material that can be purchased and/or otherwise obtained.

A visualization system in accordance with the present disclosure may generate a model of a demonstration area from a perspective. Such a visualization system may not know the perspective from which the demonstration area will be viewed. In such a situation, the visualization system may assume the perspective from which the demonstration area will be viewed and use such to generate the model. However, people viewing the projection on the demonstration area from perspectives other than the one from which the model was generated will result in the projection appearing less true to life than it otherwise would. People may view the demonstration area from perspectives other than the intended perspective from which the model was generated, and/or may move while viewing. To overcome these issues, some visualization systems, in accordance with the present disclosure, may know the perspective from which the demonstration area is being viewed and may generate models from that perspective accordingly. Further, in some implementations of such examples, the visualization system may track the person and/or changes in his perspective and/or where he is looking. The visualization system may update the model accordingly.

Another possible issue with perspective in visualization systems is that multiple people may be viewing a projection on a demonstration area. In such a situation, it is highly unlikely that more than one person would be able to view the projection from the viewpoint that the model was generated. As a result, the visualization will seem less true to life, and for at least one person more than another. This may lead to inconsistent output. To overcome these issues, some visualization systems, in accordance with the present disclosure, may determine the positions of multiple people, generate multiple versions of a model according to the positions, and provide the multiple versions to projectors in such a way that the respective versions are viewed by the respective people.

The following disclosure relates to a multi-perspective visualization system. The system may determine one or more positions of one or more people, generate one or more models of one or more demonstration areas from one or more perspectives corresponding to the position, apply one or more digital materials to the model, split the model into split images corresponding to projector zones, and provide the split images to projectors for the respective zones. If there are multiple people with multiple perspectives, the system may generate multiple versions of the model from different perspectives and configure images of the model to be projected in such a way that they are respectively viewable by the respective person that corresponds to the respective perspective from which the respective model was generated.

In this way, the user interface for the visualization system may be improved. The system may be able to perform visualization functions that the system would not previously have been able to perform absent the technology disclosed herein. This may enable the system to operate more efficiently while consuming fewer hardware and/or software resources as more resource consuming techniques could be omitted. Further, components may be omitted while still enabling visualization, reducing unnecessary hardware and/or software components and providing greater system flexibility.

These and other embodiments are discussed below with reference to FIGS. 1A-18. However, those skilled in the art will readily appreciate that the detailed description given herein with respect to these Figures is for explanatory purposes only and should not be construed as limiting.

FIG. 1A depicts a first example system 100A for material visualization. The system 100A may include one or more scanner computing devices 102, which may be communicably coupled to one or more scanners, that may scan one or more physical samples 101 (such as one or more physical samples 101 of one or more fabrics, floorings, paints, wood, paneling, stone, brick, carpet, laminates, countertops, cabinets, wallpaper, molding, tiles, paint, housewares, and so on) of a design material to generate 103 one or more digital materials.

Digital materials may be materials that may be accessed and/or visualized by computing devices. Digital materials may include materials that were not initially created as digital, but were converted to digital form through the process of digitization.

Digital materials may be digital twins of the physical materials from which they were generated. A digital twin may be a digital representation of a real-world entity or system. The implementation of a digital twin may be an encapsulated software object or model that mirrors a unique physical object, process, organization, person, abstraction, and so on. Data from multiple digital twins may be aggregated for a composite view across a number of real-world entities, such as a power plant, a city, and so on and/or their related processes.

A texture map may be a two-dimensional image of a surface that may be used to cover three-dimensional objects and describe characteristics of a given physical material. Texture maps may be a way of applying properties to a three-dimensional model so as to alter the appearance of the three-dimensional model using the aforementioned two-dimensional images. This appearance may include the three-dimensional model's color, fine detail, how shiny or metallic the three-dimensional model appears, whether or not the three-dimensional model is transparent and/or glows, and so on.

Materials digitized by "physically based rendering" (or "PBR") may be digital materials. PBR may be a methodology of shading and rendering three-dimensional models of physical materials that provides a more accurate representation of how light interacts with surfaces from a physically accurate standpoint. PBR may generate a texture stack for a digital material, which may be a series of texture maps. These texture maps may make up the physical characteristics of a digital twin of the physical material from which the digital material is generated.

The digital material may include one or more images of the respective physical sample, one or more texture stack maps generated from the respective physical sample, color information generated from the respective physical sample, scale information for the respective physical sample (which may be expressed in texel density, or pixels per unit of measure), use information (such as that the design material associated with the respective physical sample is typically used as a flooring, that the design material is typically interspersed with a grout as well as the dimensions and possible colors for such grout, and so on), light behavior (such as how reflective and/or non-reflective the respective physical sample is, how diffuse the physical sample is, and so on), metadata (such as a stock keeping unit or "SKU" associated with the physical sample, a manufacturer or supplier associated with the respective physical sample, availability of materials associated with the physical sample, time of availability of materials associated with the physical sample, durability of materials associated with the physical sample, one or more wear ratings of materials associated with the physical sample, and/or other information), and so on.

The metadata may provide real-world information for the digital material related to the respective physical sample (and/or product) from which the digital material was generated. The metadata may enable application of the digital material to surfaces of models within three-dimensional environments in a way that is accurate to the respective physical sample (and/or product) from which the digital material was generated. The metadata may include real-world width, real-world length, real-world height (thickness), pixel density, texture map width (in pixels), texture map height (in pixels), associated information (such as real-world grout width (where applicable), default grout selection (where applicable), or the like), and so on. Accurate scaling of materials may be a factor of the texture map size in pixels divided by the pixel density (which may be in inches for this case for pixel density).

The metadata may also specify constraints associated with the respective physical sample, such as scale constraints, typical uses, and so on. By way of illustration, the metadata may indicate that a tile is generally used on walls. This metadata may be used to automatically place the tile on walls when selected, to provide a warning that the tile is typically used on walls when a user attempts to place the tile on a floor, and so on. Various configurations are possible and contemplated without departing from the scope of the present disclosure.

The system 100A may also include one or more repository computing devices 104. The repository computing device 104 may store one or more digital materials generated by the scanner computing device 102. The repository computing device 104 may make stored digital materials available to one or more other devices, such as one or more rendering computing devices 105 that may use the digital materials for one or more different kinds of material visualization.

Additionally, the system 100A may further include one or more rendering computing devices 105. The rendering computing device 105 may use one or more stored digital materials and/or one or more digital materials obtained from the repository computing device 104 for one or more different kinds of material visualization. In various implementations, the rendering computing device 105 may use one or more game engines (such as the Unreal Engine) as part of ingesting one or more digital materials, generating models, adjusting models for various conditions, rendering one or more images, and so on. As illustrated, the system 100A may include one or more projector systems 110, one or more printed sheets systems 170, one or more web systems 180, and/or other systems. In some examples, the rendering computing device 105 may use one or more stored digital materials and/or one or more digital materials obtained from the repository computing device 104 for one or more different kinds of material visualization using one or more of the projector system 110, the printed sheet system 170, the web system 180, and/or one or more other systems.

By way of illustration, the rendering computing device 105 may use one or more stored digital materials and/or one or more digital materials obtained from the repository computing device 104 for material visualization using the projector system 110. The rendering computing device 105 may do so by dynamically generating a model, dynamically applying one or more selected digital materials to one or more surfaces of the model as per the specifications included in the digital materials, dynamically adjusting the model for demonstration area conditions, dynamically splitting the applied and adjusted model into processor zone images, and dynamically providing respective processor zone images to the respective projector of the projector system 110 for that zone. As the model may be adjusted for demonstration area conditions, the impact that lighting, time of day, and/or other conditions of the design area into which the design materials will be placed might have on how design materials will appear, behave, and/or integrate with other design materials may be taken into account. Further, the images supplied to the projectors of the projector system 110 may be true to life regarding the color, substance, scale, and/or other features of the respective design material because of the specifications included in the digital material. Additionally, the rendering performed by the rendering computing device 105 may be PBR because the digital materials are rendered according to the specifications included in the digital materials that were generated from scanning the physical samples 101 of the design materials. Due to the information included in the digital material related to SKU, manufacturer or supplier, and so on, the images provided to the projectors of the projector system 110 may directly correspond to a version of the design material that can be purchased and/or otherwise obtained.

By way of another illustration, the rendering computing device 105 may use one or more stored digital materials and/or one or more digital materials obtained from the repository computing device 104 for material visualization using the printed sheet system 170. The rendering computing device 105 may do so by processing an image from a digital material (such as by cropping if the image is above a selected print area, generating additional portions of the image based on the image if the image is below a selected print area), printing the image on an adhesive-backed material sheet, and laminating and/or otherwise applying one or more glossy coatings, matte coatings, and/or other coatings to cause the printed adhesive-backed material sheet to interact with light like (i.e., look and feel like) the physical sample from which the digital material was generated.

In a third illustration, the rendering computing device 105 may use one or more stored digital materials and/or one or more digital materials obtained from the repository computing device 104 for material visualization using the web system 180. The rendering computing device 105 may do so by generating a model, applying a digital material to the model, adjusting the model for web output conditions, using a virtual camera to capture the adjusted model for web output, and providing the virtual camera captured adjusted model to one or more web servers, such as one or more web servers that serve product detail pages (or "PDP").

As discussed above, the scanner computing device 102 may be communicably coupled to one or more scanners. The scanner may be any kind of scanner that is operable to scan one or more physical samples as part of generating one or more digital samples. Examples of such scanners include TAC7™ scanners, Vizoo™ scanners, METIS™ scanners, and so on.

Although the above illustrates and describes three material visualization uses for digital materials, it is understood that these are examples and that digital materials may be otherwise used and/or other material visualizations may be performed. Various configurations are possible and contemplated without departing from the scope of the present disclosure. Material visualization using the projector system 110, the printed sheet system 170, and the web system 180 are discussed in more detail below.

Figure 1B:
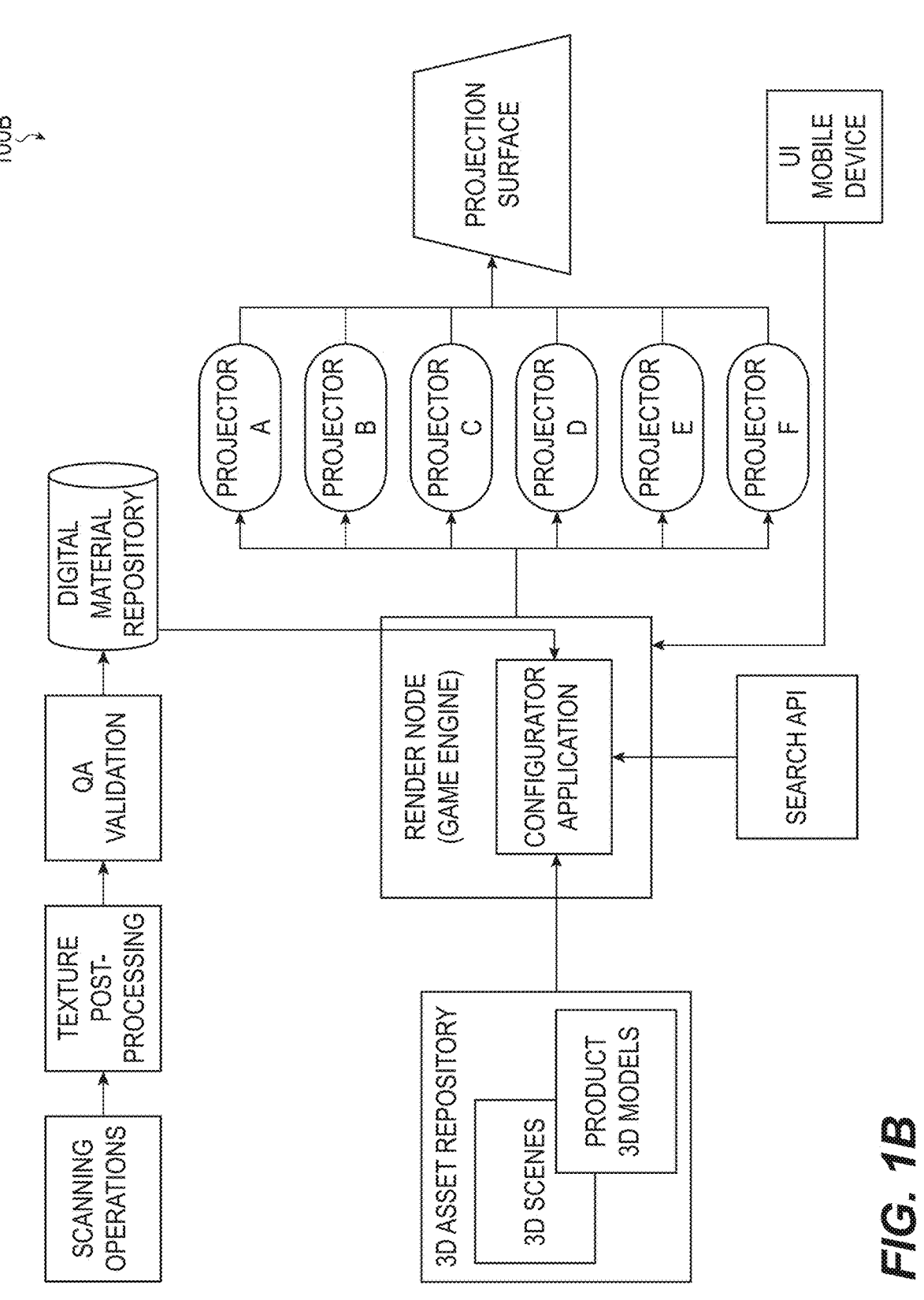
FIG. 1B depicts an example workflow that may be used with a projection studio.

FIG. 1B depicts an example workflow 100B that may be used with a projection studio. The system 100A of FIG. 1A may be used as such a projection studio.

Figure 1C:
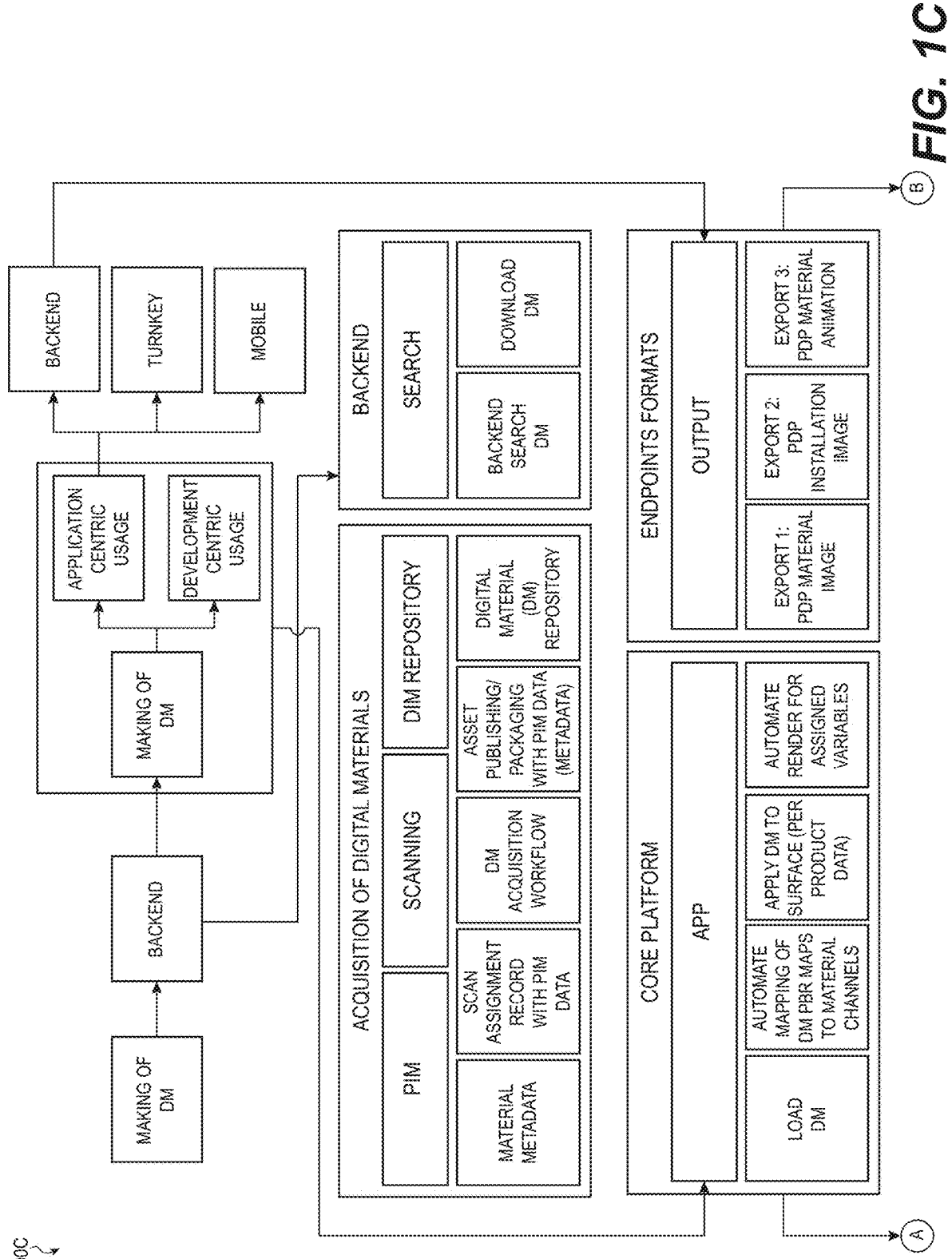
Figure 1E:
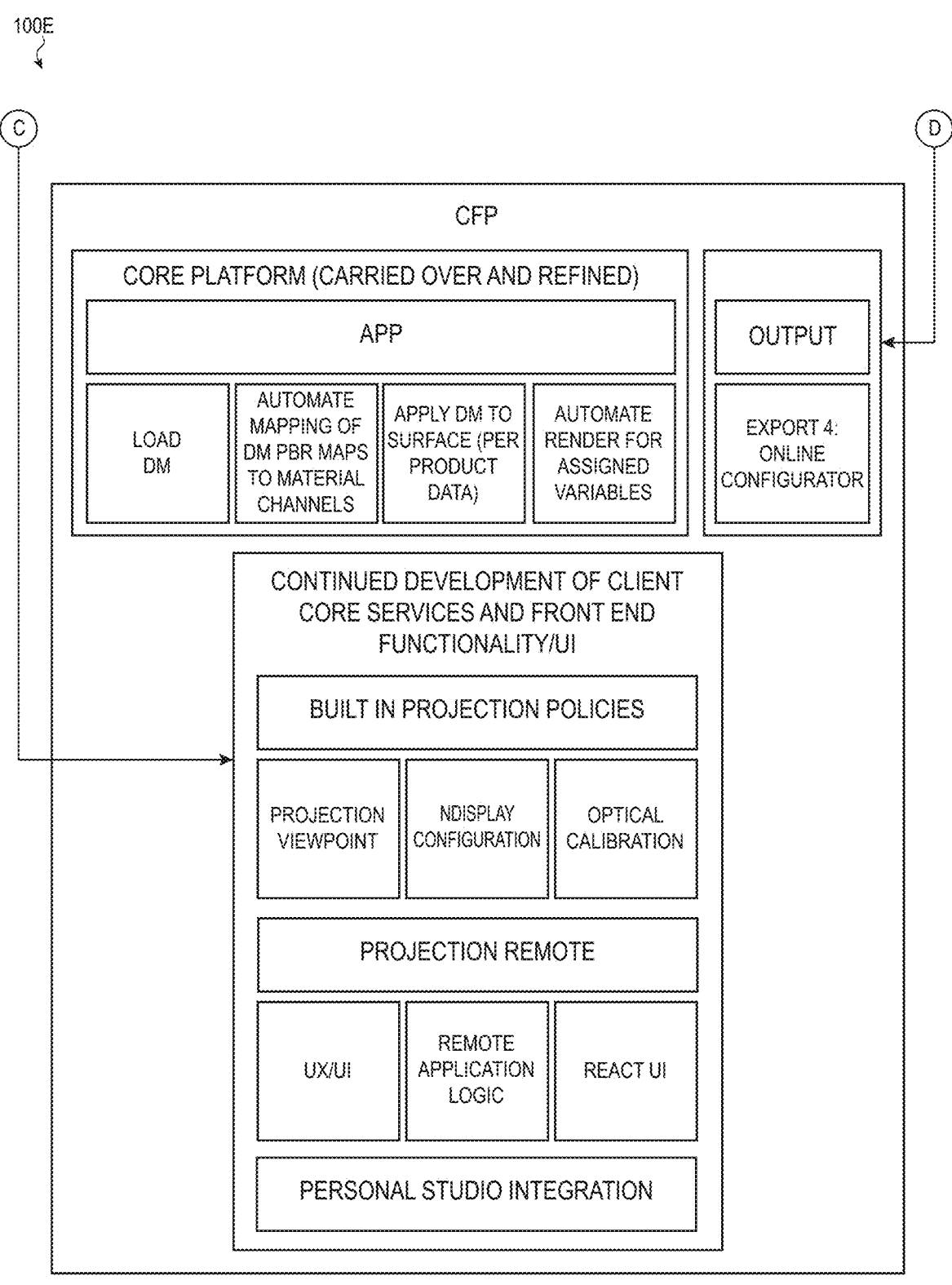

FIGS. 1C-1E depict an automated rendering pipeline 100C-100E. The automated rendering pipeline 100C-100E may be used with the workflow 100B of FIG. 1B and/or the system 100A of FIG. 1A.

Figure 2A:
FIG. 2A depicts a flow chart illustrating a first example method for generating digital materials for a material visualization system. This method may be performed by the system of FIG. 1.
Figure 2A:
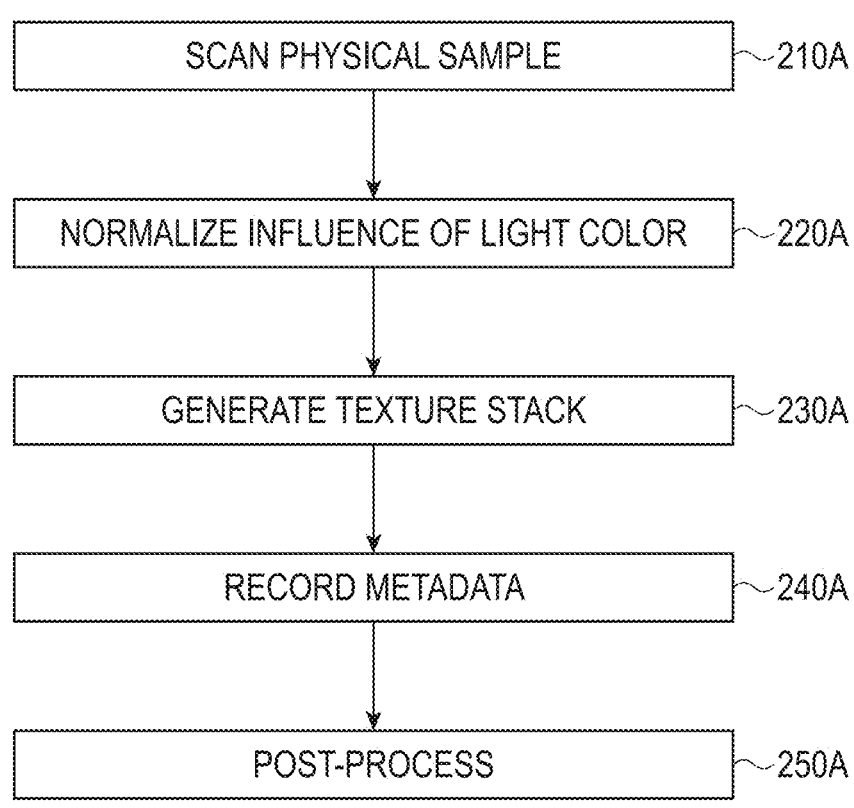

FIG. 2A depicts a flow chart illustrating a first example method 200A for generating digital materials for a material visualization system. This method 200A may be performed by the system 100A of FIG. 1A.

At operation 210A, an electronic device (such as the scanning computing device 102 of FIG. 1A) may scan one or more physical samples of one or more design materials. The scanning may use any kind of scanner that is operable to scan one or more physical samples as part of generating one or more digital samples. Examples of such scanners include TAC7™ scanners, Vizoo™ scanners, METIS™ scanners, and so on.

At operation 220A, the electronic device may normalize the influence of light color on the scanning. Scanning generally involves use of one or more light sources. Such light sources may have a color temperature and/or light color that may cause a resulting image to appear different than the physical sample scanned under reference lighting conditions. Normalizing the influence of light color on the scanning may correct for this, causing the resulting image to appear the same (i.e., "true to life") and/or substantially similar to the physical sample scanned under reference lighting conditions. As a result, the system may be linearized to be color accurate.

For example, a number of example physical scan items (which may correspond to samples of white, shades of gray, and/or one or more colors) may be scanned that correspond to example scan item images that appear the same as the example physical scan items. These example physical scan items and the corresponding example scan item images may be used to calibrate the scanning process in order to normalize the influence of light color on the scanning. This may be performed by scanning one or more of the example physical scan items and comparing the resulting scan images to the respective example scan item images, determining one or more light color corrections to be performed to get the resulting scan images to match or substantially match the respective example scan item images, and then making the same light color corrections to later obtained scan images of other physical samples. This may linearize the scanning system (i.e., create a scale over all of the different shades such that deviation from actual color is less than approximately 3-6%).

At operation 230A, the electronic device may generate a texture stack. The texture stack 200B may include an alpha (opacity) texture map, a displacement (bump, height) texture map, a roughness (opposite of glossiness) texture map, a metallic (metalness) texture map, a normal texture map, a base color (albedo) texture map, and so on.

At operation 240A, the electronic device may record metadata. The metadata may provide real-world information for the digital material related to the respective physical sample (and/or product) from which the digital material was generated. The metadata may enable application of the digital material to surfaces of models within three-dimensional environments in a way that is accurate to the respective physical sample (and/or product) from which the digital material was generated. The metadata may include real-world width, real-world length, real-world height (thickness), pixel density, texture map width (in pixels), texture map height (in pixels), associated information (such as real-world grout width (where applicable), default grout selection (where applicable), or the like), and so on.

At operation 250A, the electronic device may post-process one or more images. Such post-processing may create a seamlessly tileable digital material; a modular, object-based digital material; and so on.

In various examples, this example method 200A may be implemented as a group of interrelated software modules or components that perform various functions discussed herein. These software modules or components may be executed within a cloud network and/or edge network and/or by one or more computing devices, such as the scanning computing device 102 of FIG. 1A.

Although the example method 200A is illustrated and described as including particular operations performed in a particular order, it is understood that this is an example. In various implementations, various orders of the same, similar, and/or different operations may be performed without departing from the scope of the present disclosure.

For example, in some implementations, the method 200A may include one or more operations for reducing scan time. By way of illustration, some physical samples (such as carpets with geometric designs) may include one or more areas that are virtually identical and/or otherwise repetitive of one or more other areas. Rather than scan all such virtually identical and/or otherwise repetitive areas, the method 200A may include determining that such virtually identical and/or otherwise repetitive areas are present, omitting scanning one or more of the virtually identical and/or otherwise repetitive areas, and using scan data from scanning one or more of the other virtually identical and/or otherwise repetitive areas instead of scanning the one or more virtually identical and/or otherwise repetitive areas. In this way, the efficiency of the scanning computing device 102 may be improved.

Figure 2B:
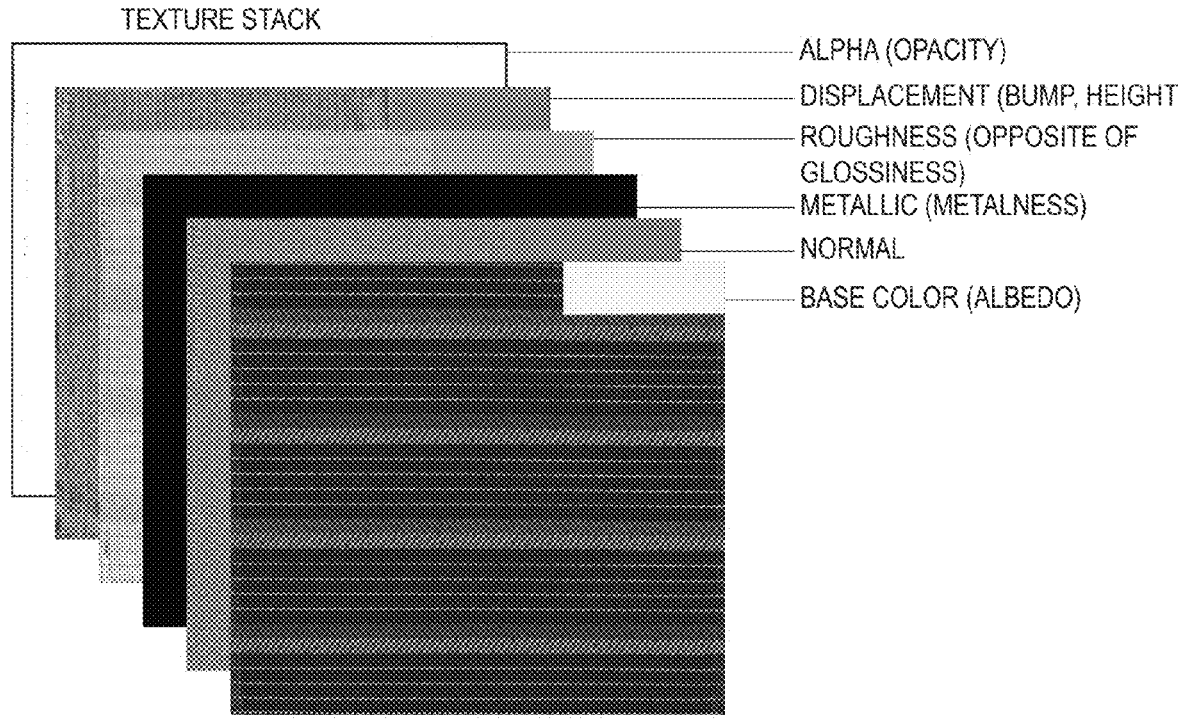
FIG. 2B depicts an example of a texture stack.

FIG. 2B depicts an example of a texture stack 200B. As described above, texture stacks may be a series of texture maps that represent the respective characteristics of a given PBR material. These texture maps may be combined together in three-dimensional renderers with each texture map assigned to its relevant material shader to provide accurate data for each shader's physical interaction with lights within a given three-dimensional space.

Scanning equipment may be capable of generating the raw maps from physical samples scanned from a physical inventory at a hub. These raw maps may be post-processed. Such post-processing may create a seamlessly tileable digital material; a modular, object-based digital material; and so on.

For example, a tile may have edges that are not visible when the tile is used to form a mosaic with other tiles. As such, an image of the tile may be post-processed to create a modular, object-based digital material by cropping in on edges of and/or squaring off a scanned image of the tile. Various configurations are possible and contemplated without departing from the scope of the present disclosure.

By way of another example, a wooden board may have a grain. Combining images of a single board into a compound image instead of multiple images of multiple boards may be visibly apparent due to the grain (creating the effect of combining squares of a cloth resulting in a quilt instead of a single larger piece of the cloth). As such, post-processing of an image of the wooden board to create a seamlessly tileable digital material may involve combining images of the wooden board into a compound image while masking, aligning, ensuring sufficient grain is present to enable pattern repeat (and/or estimating how the pattern would extend and extending such according to the estimation), and/or offsetting edges of the individual images of the wooden board. Various configurations are possible and contemplated without departing from the scope of the present disclosure.

In still another example, bricks may have slight variations from each other. Post-processing may involve scanning multiple bricks to determine variations and then altering one or more individual brick images to account for the variations. Various configurations are possible and contemplated without departing from the scope of the present disclosure.

In yet another example, a carpet may have a repeating pattern. Rather than scanning the same repeating pattern over and over, a determination may be made that the pattern repeats and the repeating pattern may be created based on the scanning that has already occurred. Various configurations are possible and contemplated without departing from the scope of the present disclosure.

In still another example, correction for influence of light color during scanning was discussed. However, the way that a physical material behaves in response to light may still need to be determined and stored in the digital material and/or related metadata in order to be able to accurately render the digital material and/or the response of the digital material to light. As such, the way that a physical material behaves in response to light (i.e., how much the material reflects light, diffuses light, and so on) may be determined and stored in the digital material and/or related metadata as part of post-processing. Various configurations are possible and contemplated without departing from the scope of the present disclosure.

Additionally and/or alternatively, post-processing may involve one or more other processes, such as one or more quality assurance processes. Various configurations are possible and contemplated without departing from the scope of the present disclosure.

In various examples, post-processing may be performed using various software tools at the direction of one or more graphical artists. In other examples, such a process may be automated, controlled by artificial intelligence and/or machine learning informed by previous post-processing performed using various software tools at the direction of one or more graphical artists, and so on.

The texture stack 200B may be raw and pre-processed. As shown, the texture stack 200B may include an alpha (opacity) texture map, a displacement (bump, height) texture map, a roughness (opposite of glossiness) texture map, a metallic (metalness) texture map, a normal texture map, a base color (albedo) texture map, and so on.

There may be at least two workflows for rendering PBR materials. These include a metallic/roughness workflow, a specular/glossy workflow, and so on. In some examples, digital materials may be set up to primarily support the metallic/roughness workflow as this may be the most common in real-time rendering environments. Converting PBR texture stacks to be useful between workflows may be a relatively simple operation.

The biggest difference between a metallic/roughness workflow and a specular/glossy workflow may be in how the diffuse and reflectivity content is defined in the texture maps. In the specular/glossy workflow, these values maybe set explicitly within two unique texture maps. The metallic/roughness workflow, on the other hand, may use an albedo texture map to define both the diffuse and reflectivity content and a metallic texture map to define whether the material is dielectric or a metal.

The metallic/roughness workflow may use a base color texture map, a metallic texture map, and a roughness texture map to generate a combined result. The specular/glossy workflow may use a diffuse texture map, a specular texture map, and a glossiness texture map to generate a combined result.

Certain embodiments may calibrate a system output to provide an accurate, true-to-original-sample color. As different projectors, displays, and other output devices may vary in their color gamut and color accuracy, this calibration is designed to accurately measure and portray an output against colors of an original sample scanned into the system. Further, calibration routines may account for color shifts of an output due to a color or tint of a projection surface, room lighting, and the like. That is, the calibration routine may measure an output color as seen by a user under existing conditions and change that output to accurately recreate a sample's color(s) while taking into account environmental factors.

FIG. 2C is a flowchart illustrating a sample method 200C for calibration of a system output. Initially, the operation begins in operation 210C, where a sample is assigned to a particular colorway or set of colorways. Each colorway is a set of similar or related color values, often within a bounded range of one another. Thus, a colorway may represent a set of shades or ranges of a particular base color in some embodiments. Each color value in a colorway has values corresponding to coordinates in a color space, such as X-Y values indicating a position within a given color space. The color values may include a third value corresponding to a luminance. Oftentimes, these values are referred to as "xyY" values, where the lowercase x and y numbers are axial coordinates within a color space and the uppercase Y number corresponds to a luminance.

Next, in operation 220C, the sample is scanned, digitized, recorded, or otherwise analyzed and entered into the system. Certain embodiments may use a large flatbed scanner (such as, for example, a Vizoo A2 scanner) while others utilize a moving overhead scanner (one example of which is a Metis scanner). Typically, although not necessarily, scanners are calibrated weekly by scanning a color chart having known values and comparing those values to the xyY values obtained from the scanner (or other color space values). Differences between actual and scanned values are linearly adjusted in order to ensure the scanner is accurately calibrated prior to scanning the sample.

In operation 230C, color values for the sample digital data are corrected by mapping them to target values in a CIE color space. The scanner is typically calibrated to a color space, such as the CIE color space, and the sample is scanned to produce a set of sample digital data. The sample digital data includes color values for each color of the sample. This sample digital data is normalized about the CIE color space scale, thereby normalizing the color values of the sample with respect to the scanner. "Linearization" may determine a best-fit line across an entire set of colors or color gamut for the sample digital data, and that best-fit line is used to correct the digital data for the sample. For example, color values deviating from the best-fit line by less than a threshold amount may be matched to, or moved to, the line. As an alternative example, each value within a given color may linearly adjusted by a set or proportionate offset amount. Thus, linearization may be either applied across a color space (e.g., uniformly across all instances of sample digital data) or individually to each single color (e.g., fitting each instance of sample digital data to a best-fit line, curve, or the like, and so adjusting each instance of sample digital data by an individual amount).

Following or concurrently with operation 230C, in operation 230C the mapped color values for the sample digital data are adjusted to account for the system output's color gamut. In this operation the scanned colors of the material are plotted in a color space (and a color gamut within that space) against the "true" value of each color, as assigned in operation 220C. Typically, an embodiment utilizes xyY values for this where x and y are coordinates within a color space and Y is luminance, as previously mentioned.

It should be noted that sample colors (or, more particularly, instances of sample digital data) can vary in Y/luminance only. For example, different shades of gray are generally distinguished only by differing Y values. This yields an idealized set of color values for a material. An "idealized" color space is a pure space, unadjusted for any projector characteristics or errors.

As part of operation 230C, the idealized color space (and/or the idealized color gamut) is mapped to the actual color space (and/or gamut) of the real-world projector. This is done by measuring the projector outputs and comparing them back to the idealized color space/gamut. This comparison yields a set of xyY values for each color of interest, which can be the material colors, a set of representative colors, a set of color gamut edge points/colors, or any other set of colors, that can be used to adjust the idealized color gamut. Depending on the variance between the idealized color space or gamut and the actual color space or gamut of the projector, the entirety of the idealized color space/gamut may be adjusted in a single operation or different points in the idealized color space/gamut may be individually adjusted.

Finally, in operation 240C the system output projects, displays, or otherwise outputs an image of the sample from the projector.

An embodiment may measure this output to calibrate specifically for the color values of a given image, thereby providing real-time feedback and adjustment. Alternatively, the output may be measured weekly or at any given interval to detect and account for any drift in the output device.

Figure 3:
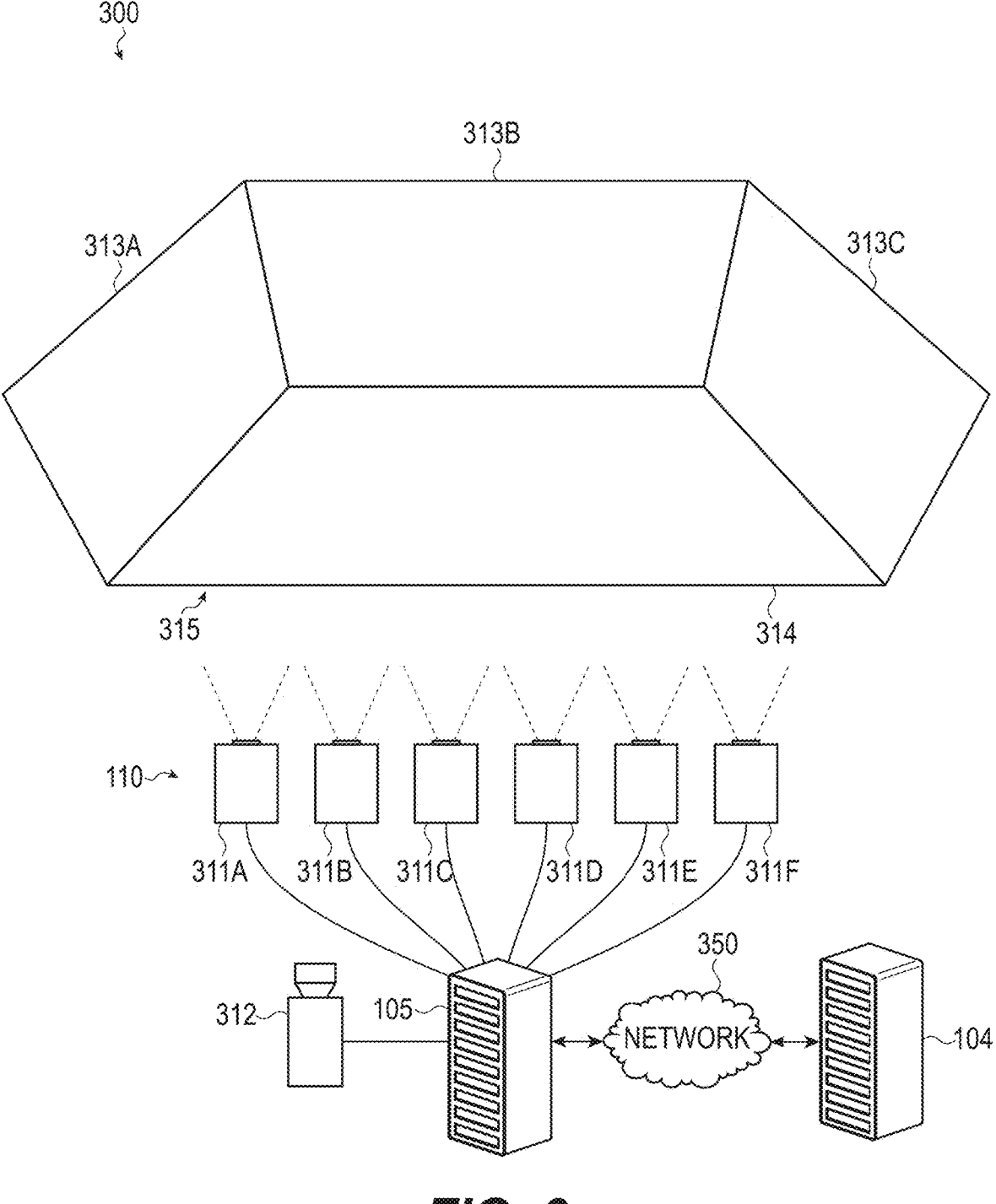
FIG. 3 depicts a second example system for material visualization.

FIG. 3 depicts a second example system 300 for material visualization. The system 300 may include one more rendering computing devices 105, one or more repository computing devices 104, one or more wired and/or wireless communication networks 350, one or more sensors 312 (such as light sensors, cameras, and so on), a projector system 110 including a number of projectors 311A-311F, and an example demonstration area 315 involving a number of walls 313A-313C and a floor 314.

The rendering computing device 105 may use one or more stored digital materials and/or one or more digital materials obtained from the repository computing device 104 for material visualization using the projectors 311A-311F. The rendering computing device 105 may do so by dynamically generating a model, dynamically applying one or more selected digital materials (which may be dynamically selected via user input received via a user interface) to one or more surfaces of the model as per the specifications included in the digital materials (such as by using one or more UV maps included in the digital materials that specify true to life scaling of the digital material across the pixels of the surfaces) (which may involve unwrapping one or more images included in the digital materials and wrapping them around the surfaces), dynamically adjusting the model (which may involve light simulation) for demonstration area conditions (which may be detected using the sensor 312, such as where light and/or other conditions of the example demonstration area 315 differ from the model, where light from one or more of the projectors 311A-311F bounces to interfere with the projection of one or more of the other projectors 311A-311F, and so on), dynamically splitting the applied and adjusted model into processor zone images, and dynamically providing respective processor zone images to the respective one of the projectors 311A-311F for that zone. As the model may be adjusted for demonstration area conditions, the impact that lighting (which may be performed using ray tracing using light responsiveness information included in the digital material, lighting specifications for the model, ways that the example demonstration area 315 differs from the model that may need to be corrected for so that the model appears as intended when projected into the demonstration area 315), time of day, and/or other conditions of the design area into which the design materials will be placed might have on how design materials will appear, behave, and/or integrate with other design materials may be taken into account. Further, the images supplied to the projectors of the projector system 100A may be true to life regarding the color, substance, scale, and/or other features of the respective design material because of the specifications included in the digital material. Additionally, the rendering performed by the rendering computing device 105 may be PBR because the digital materials are rendered according to the specifications included in the digital materials that were generated from scanning the physical samples of the design materials. Due to the information included in the digital material related to SKU, manufacturer or supplier, and so on, the images provided to the projectors 311A-311F may directly correspond to a version of the design material that can be purchased and/or otherwise obtained.

As discussed above, the model may be generated from a viewpoint. In some cases, that may be a static viewpoint, such as from an assumption that a viewer will be standing before the example demonstration area 315 at the very middle. The viewpoint from which the model is generated may be significant. For example, some sidewalk art appears to be three-dimensional when viewed from the viewpoint from which the perspective is generated and two-dimensional from other viewpoints.

In some examples, the rendering computing device 105 may perform one or more of the above operations using a gaming engine, such as the Unreal Engine. The rendering computing device 105 may use one or more plugins and/or other software and/or hardware components to supplement and/or leverage the rendering capabilities of the gaming engine to import, generate, and/or render and/or adjust and/or project one or more digital materials and/or models. Various configurations are possible and contemplated without departing from the scope of the present disclosure.

The projectors 311A-311F may be configured to project onto different zones of the demonstration area 315. The rendering computing device 105 may assign each of the projectors 311A-311F to their respective zones and/or otherwise determine which of the projectors 311A-311F to use for which zone as part of a projector calibration process. The zones may be configured to overlap. This may result in a more true to life material visualization as there may not be gaps between zones and/or projected images. As multiple of the projectors 311A-311F may be projecting into overlapping areas between zones, the projectors 311A-311F may be configured (and/or instructed by the rendering computing device 105) to reduce the intensity of pixels in the overlapping areas as compared to pixels in non-overlapping areas to avoid and/or reduce intensity distortion in the overlapping areas.

For example, each of two projectors 311A-311F projecting into an overlapping area may each reduce the intensity of pixels in the overlapping areas by 50% as compared to pixels in non-overlapping areas to avoid and/or reduce intensity distortion in the overlapping areas. In another example, one of two projectors 311A-311F projecting into an overlapping area may reduce the intensity of pixels in the overlapping areas by 25% as compared to pixels in non-overlapping areas to avoid and/or reduce intensity distortion in the overlapping areas whereas the other of the two projectors 311A-311F projecting into an overlapping area may reduce the intensity of pixels in the overlapping areas by 75% as compared to pixels in non-overlapping areas to avoid and/or reduce intensity distortion in the overlapping areas. Various configurations are possible and contemplated without departing from the scope of the present disclosure.

The projectors 311A-311F may be automatically and/or otherwise calibrated. To adjust for thermal drift, the projectors 311A-311F may not be calibrated until the projectors 311A-311F are brought up to their running temperature. Various configurations are possible and contemplated without departing from the scope of the present disclosure.

In some examples, the projectors 311A-311F may all be mounted to the same mounting apparatus, such as a metal rack mounted to a ceiling. This may prevent deviations from occurring after calibration of the projectors 311A-311F that could be caused by relative movement of the structures (such as may be caused by temperature drift) to which one or more of the projectors 311A-311F were mounted had they not been mounted to the same mounting apparatus. The projectors 311A-311F may also be calibrated and/or aligned after being brought up to operating temperature to prevent subsequent temperature drift from causing one or more of the projectors 311A-311F to become misaligned.

Control of the projectors 311A-311F in concert by the rendering computing device 105 may be significant for ensuring that the resulting dynamic projection is true to life of the physical materials and the model as this ensures that all portions of the dynamic projection maintain pixel density, accurate color, alignment, and so on. By way of contrast, individual control of the projectors 311A-311F may result in a projection that has portions with differing pixel density, color, misalignment, and/or other inaccuracies that are not true to life of the physical materials and the model. The rendering computing device 105 may include one or more graphics cards (such as one or more NVIDIA 9600 RTX graphics cards) that enable control of the projectors 311A-311F in concert by the rendering computing device 105.

The projectors 311A-311F may be any kind of projectors, such as a digital light processing projector, a liquid crystal display projector, and/or any other image projecting device. One or more of the projectors 311A-311F may have a resolution of at least 4K (such as 3840×2160 pixels, 4096× 2160 pixels, and so on). The higher the resolution of the projectors 311A-311F, the more true to life the projections may appear, though this may also be limited by the quality of the images used in the digital materials. Although six projectors 311A-311F are shown and described, it is understood that this is an example. In other implementations, other numbers of projectors 311A-311F may be used (such as two, five, ten, and so on) without departing from the scope of the present disclosure.

Further, although the projectors 311A-311F are illustrated and described as forward projection devices, it is understood that this is an example. In some implementations, one or more of the projectors 311A-311F may be replaced with one or more rear projection devices and the walls 313A-313C, floor 314, and/or other element may be configured as a translucent and/or transparent screen onto which the rear projection devices may project. In some cases, rear projection implementations may not generate material visualization projections that are as true to life as front projection implementations. However, rear projection implementations may still have the advantage that an observer could walk through the example demonstration area 315 without interrupting any of the projection. Various configurations are possible and contemplated without departing from the scope of the present disclosure.

In various examples, one or more surfaces of the example demonstration area 315 may include one or more surface treatments to prevent and/or reduce light bounce from one or more of the projectors 311A-311F interfering with the projection by one or more other of the projectors 311A-311F. For example, such a surface treatment may include carbon nanotubes (such as crushed carbon nanotubes) applied in one or more polymers. Alternatively and/or additionally, the surface treatments may include one or more treatments that allow reflection of light projected straight at the surface but inhibit reflection of light traveling at angles to the surface, such as from light bounce. Various configurations are possible and contemplated without departing from the scope of the present disclosure.

As described above, modeling may be performed and the model may be adjusted for perspective and/or lighting conditions in the environment in which the demonstration area 315 is located. In some examples, a user may use an app and/or other application (such as executing on a smart phone or other electronic device) to take a light meter measurement of an intended environment. This light meter measurement may be use to adjust the model for lighting conditions, which may include determining the color spectrum associated. Alternatively, the user may provide information regarding the lighting that will be present in the intended environment, such as information regarding lighting that will be used. In another example, the app may be used to take a picture of a white piece of paper and/or other reference in the intended environment and data may be derived from the picture and used to adjust the model for lighting conditions. Various configurations are possible and contemplated without departing from the scope of the present disclosure.

Figure 4:
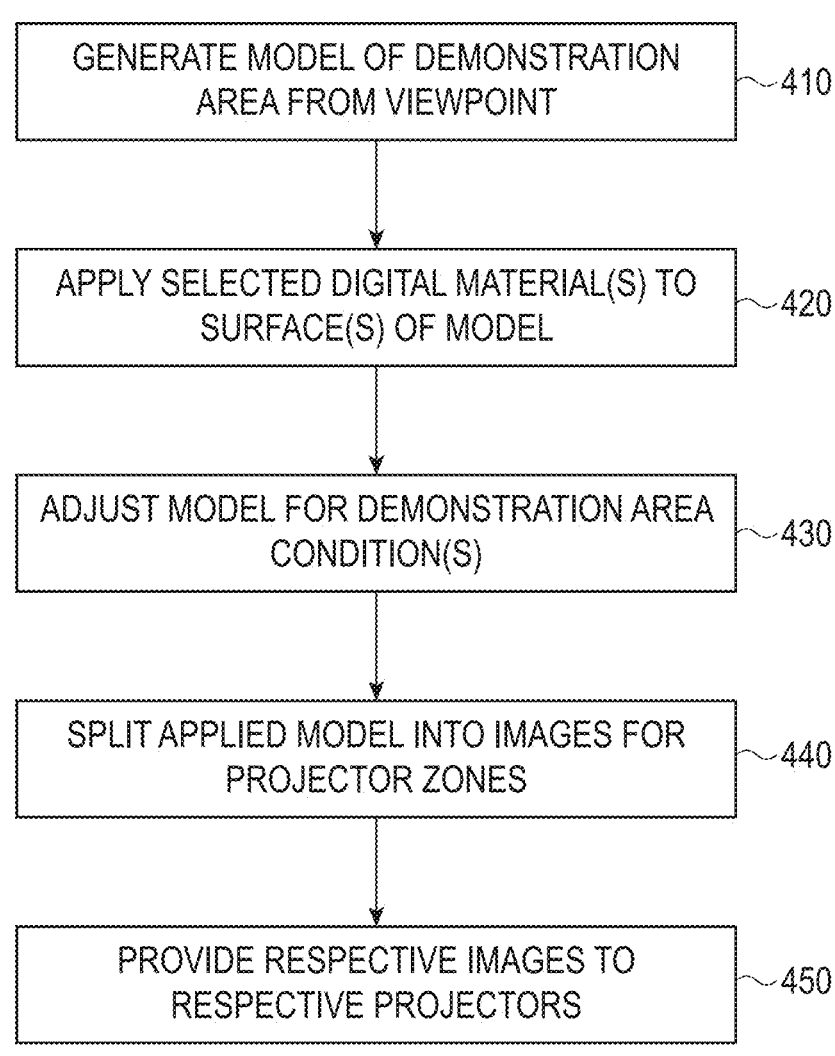
FIG. 4 depicts a flow chart illustrating a first example method for material visualization. This method may be performed by the system of FIG. 1A or the system of FIG. 3.

FIG. 4 depicts a flow chart illustrating a first example method 400 for material visualization. This method 400 may be performed by the system 100A of FIG. 1A or the system 300 of FIG. 3.

At operation 410, an electronic device (such as the rendering computing device 105 of FIGS. 1A and/or 3) may generate a model of a demonstration area from a viewpoint. The demonstration area may be the example demonstration area 315 of FIG. 3.

At operation 420, the electronic device may apply one or more selected digital materials to at least part of one or more surfaces of the model. Each digital material may include one or more images of a respective physical sample, one or more texture stack maps generated from the respective physical sample, color information generated from the respective physical sample, scale information for the respective physical sample (which may be expressed in texel density, or pixels per unit of measure), use information (such as that the design material associated with the respective physical sample is typically used as a flooring, that the design material is typically interspersed with a grout as well as the dimensions and possible colors for such grout, and so on), light behavior (such as how reflective and/or non-reflective the respective physical sample is, how diffuse the physical sample is, and so on), metadata (such as a stock keeping unit or "SKU" associated with the physical sample, a manufacturer or supplier associated with the respective physical sample, and/or other information), and so on.

At operation 430, the electronic device may adjust the applied model for one or more demonstration area conditions. Such demonstration area conditions may include the impact that lighting (which may be performed using ray tracing using light responsiveness information included in the digital material, lighting specifications for the model, ways that the demonstration area differs from the model that may need to be corrected for so that the model appears as intended when projected into the demonstration area), time of day, and/or other conditions of the design area into which the design materials will be placed might have on how design materials will appear, behave, and/or integrate with other design materials.

At operation 440, the electronic device may split the adjusted applied model into images for one or more projector zones. The electronic device may assign projectors to respective zones and/or otherwise determine which of the projectors to use for which zone as part of a projector calibration process.

At operation 450, the electronic device may provide the respective images to the respective projectors. This may cause the projectors to project the images into the demonstration area, generating a true to life visualization of the digital materials applied to the model.

In various implementations, the method 400 and/or similar and/or related methods may involve one or more feedback loops. In such implementations, generation and/or projection of images onto all surfaces may operate in unison to render a complete image of the space/materials/conditions, and so on. As such, any variable that impacts one of the surfaces may impacts all of the surfaces and accordingly may be updated in real time. These updates may be performed using one or more run-time commands, which may user prompted and/or automated, that may continuously modify the rendering of the images of the space/materials/conditions, and so on. This feedback loop may support decision making by the user.

In various examples, this example method 400 may be implemented as a group of interrelated software modules or components that perform various functions discussed herein. These software modules or components may be executed within a cloud network and/or edge network and/or by one or more computing devices, such as the rendering computing device 105 of FIGS. 1A and/or 3.

Although the example method 400 is illustrated and described as including particular operations performed in a particular order, it is understood that this is an example. In various implementations, various orders of the same, similar, and/or different operations may be performed without departing from the scope of the present disclosure.

For example, the above illustrates and describes the electronic device may split the adjusted applied model into images for one or more projector zones. However, it is understood that this is an example. In various implementations, the electronic device may split the adjusted applied model into images for one or more projectors that then project into respective projector zones. Various configurations are possible and contemplated without departing from the scope of the present disclosure.

Figure 5A:
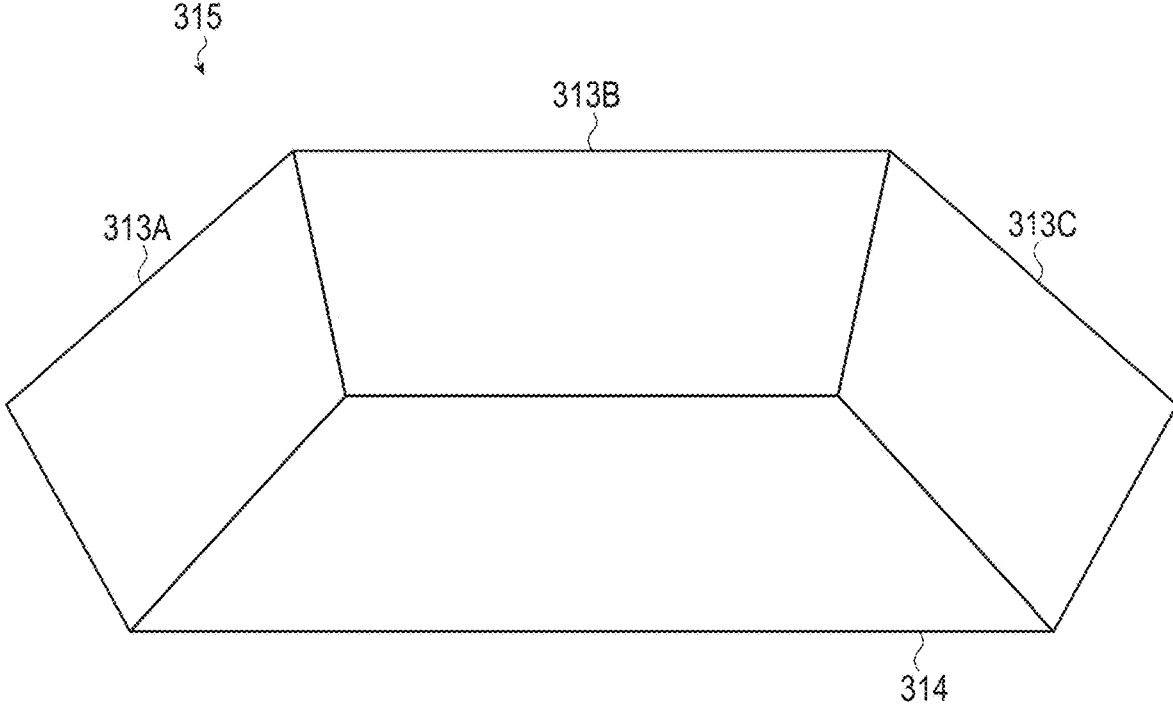
FIG. 5A depicts an example demonstration area.

FIG. 5A depicts an example demonstration area 315. The example demonstration area 315 includes a first wall 313A, a second wall 313B, a third wall 313C, and a floor 314.

Figure 5B:
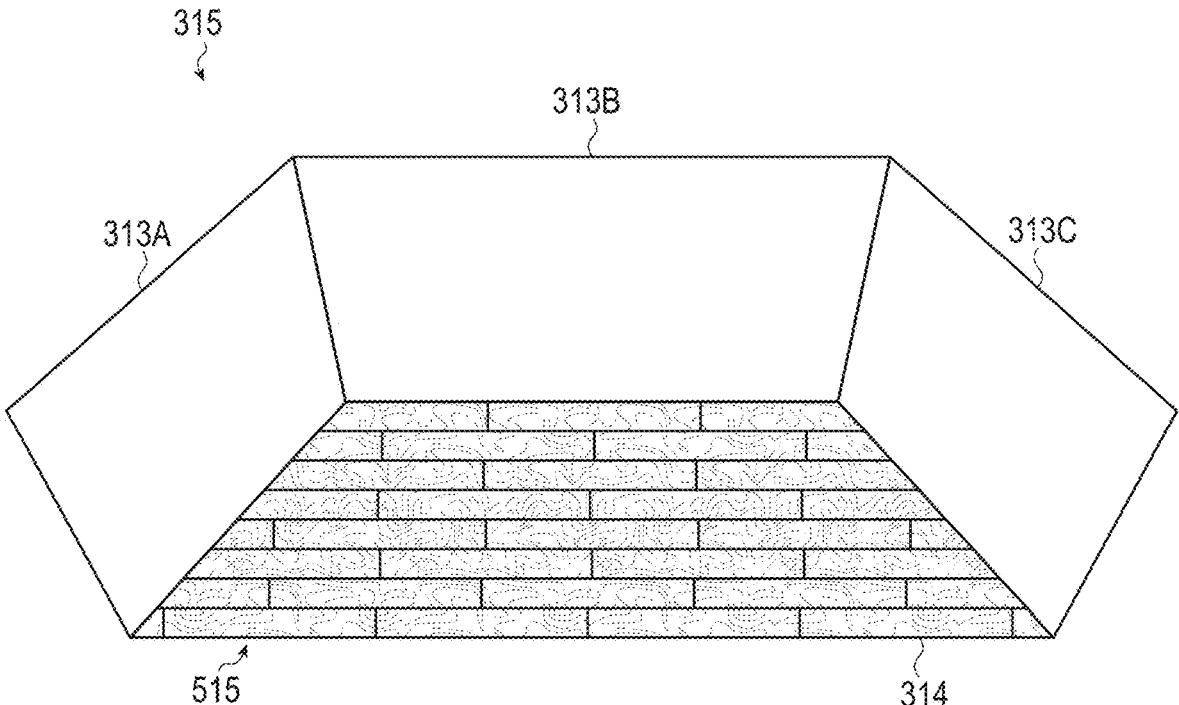
FIG. 5B depicts the example demonstration area of FIG. 5A with a wood flooring digital material projected onto the floor.

FIG. 5B depicts the example demonstration area 315 of FIG. 5A with a wood flooring digital material 515 projected onto a floor 314. This may be performed by the system 300 of FIG. 3 in response to receiving user input to project the wood flooring digital material 515 onto the floor 314.

Figure 5C:
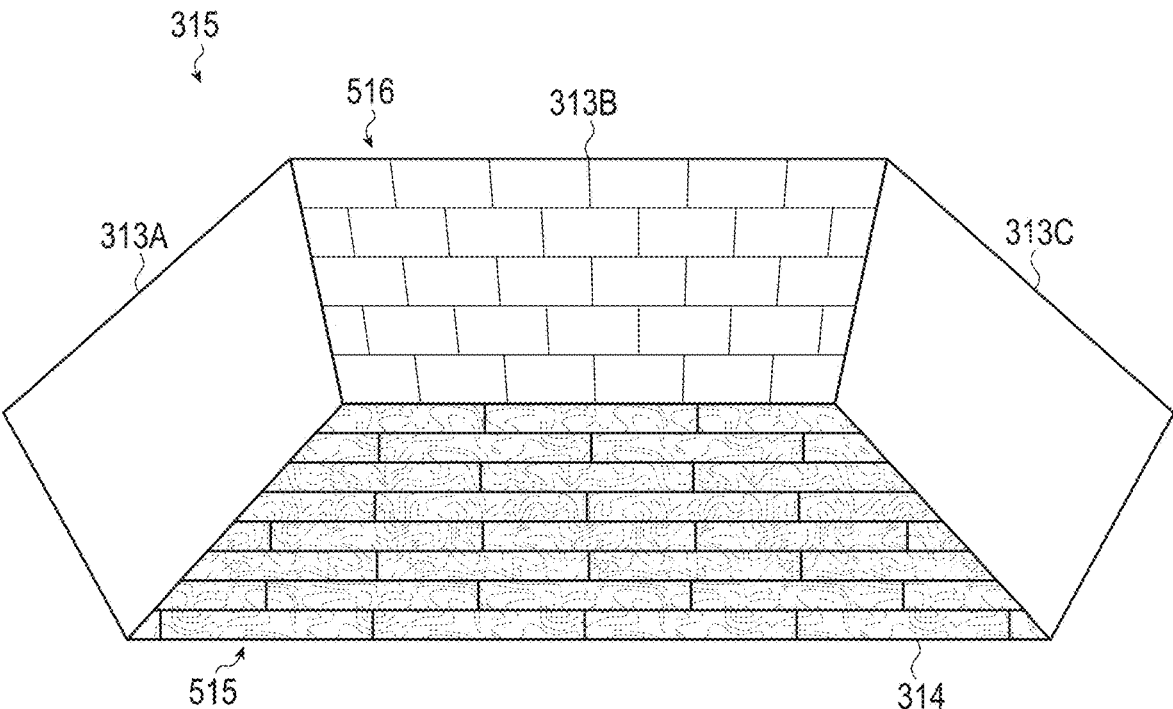
FIG. 5C depicts the example demonstration area of FIG. 5B with a wall tile digital material projected onto the second wall.

FIG. 5C depicts the example demonstration area of FIG. 5B with a wall tile digital material 516 projected onto the second wall 313B. This may be performed by the system 300 of FIG. 3 in response to receiving user input to project the wall tile digital material 516 onto the second wall 313B.

Figure 5D:
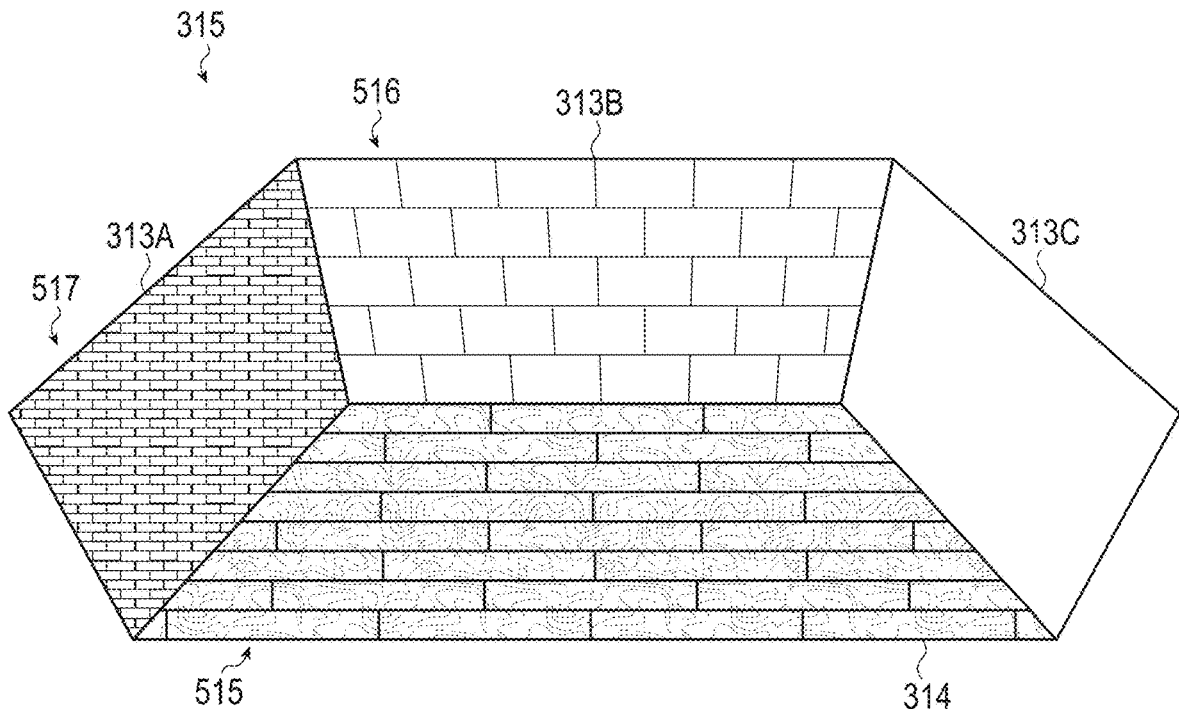
FIG. 5D depicts the example demonstration area of FIG. 5C with a brick wall digital material projected onto the first wall.

FIG. 5D depicts the example demonstration area of FIG. 5C with a brick wall digital material 517 projected onto the first wall 313A. This may be performed by the system 300 of FIG. 3 in response to receiving user input to project the brick wall digital material 517 onto the first wall 313A.

Figure 5E:
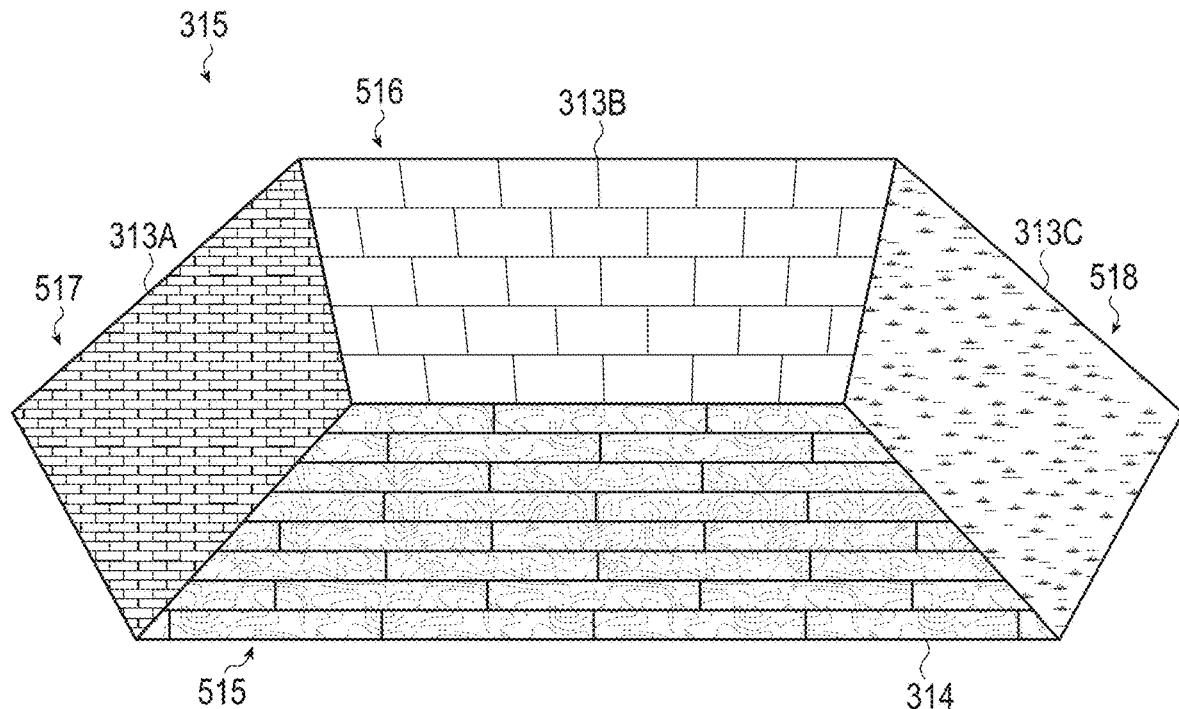
FIG. 5E depicts the example demonstration area of FIG. 5D with a wallpaper digital material projected onto the third wall.

FIG. 5E depicts the example demonstration area of FIG. 5D with a wallpaper digital material 518 projected onto the third wall 313C. This may be performed by the system 300 of FIG. 3 in response to receiving user input to project the wallpaper digital material 518 onto the third wall 313C.

Figure 5F:
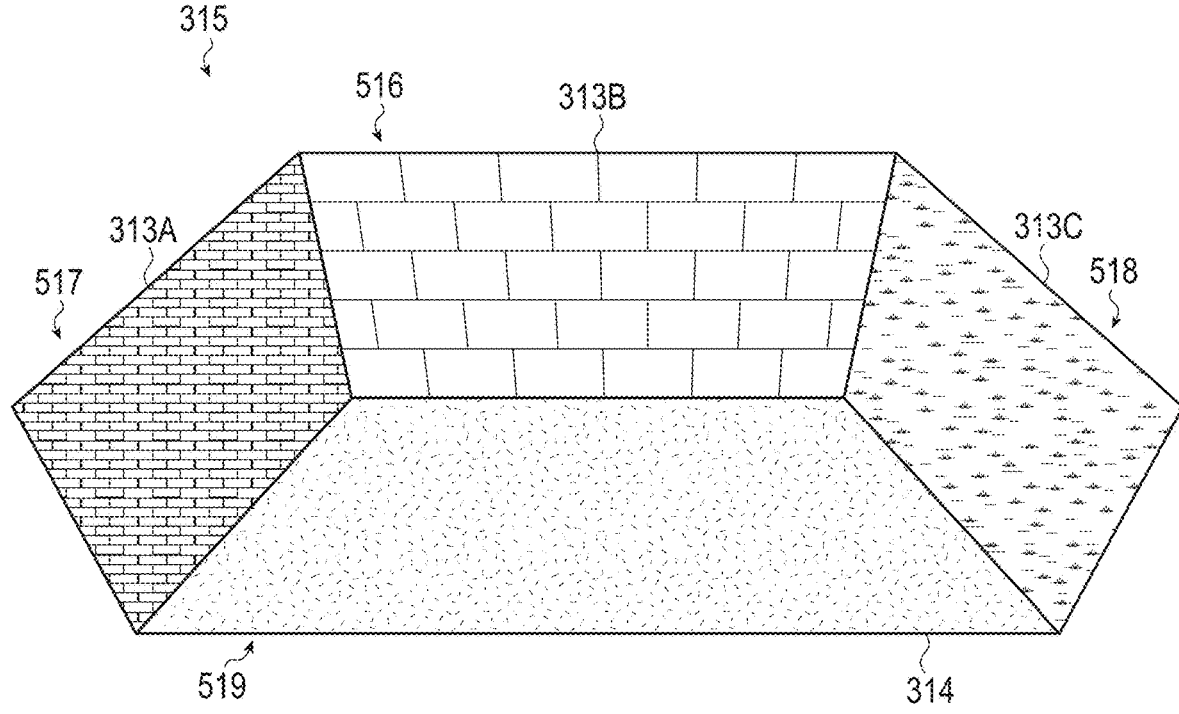
FIG. 5F depicts the example demonstration area of FIG. 5E with the wood flooring digital material replaced with a carpet digital material projected onto the floor.

FIG. 5F depicts the example demonstration area of FIG. 5E with the wood flooring digital material 515 replaced with a carpet digital material 519 projected onto the floor 314. This may be performed by the system 300 of FIG. 3 in response to receiving user input to replace the wood flooring digital material 515 projected onto the floor 314 with the carpet digital material 519.

Although FIGS. 5B-5F depict projection of a wood flooring digital material 515, a wall tile digital material 516, a brick wall digital material 517, a wallpaper digital material 518, and a carpet digital material 519, it is understood that these are examples. In various implementations, any two-dimensional digital material and/or three-dimensional digital material and/or other object may be projected without departing from the scope of the present disclosure.

It is understood that FIGS. 5B-5F are illustrative only. FIGS. 5B-5F are not intended to accurately demonstrate the perspective of materials projected onto the floor 314 or the walls 313A-313C.

Figure 6:
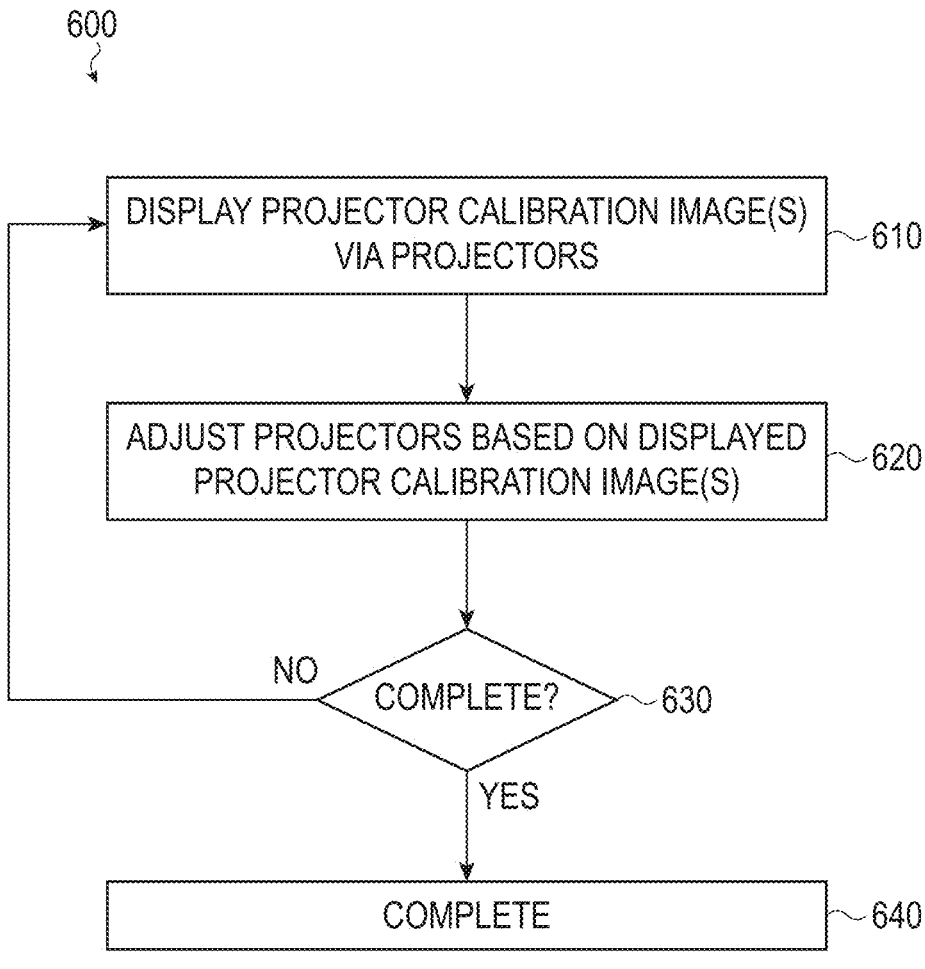
FIG. 6 depicts a flow chart illustrating a first example method for projector system calibration. This method may be performed by the system of FIG. 1A or the system of FIG. 3.
Figure 7A:
FIGS. 7A-7D depict projector system calibration maps. These projector system calibration maps may be used with the system of FIG. 1A or the system of FIG. 3.
Figure 7A:
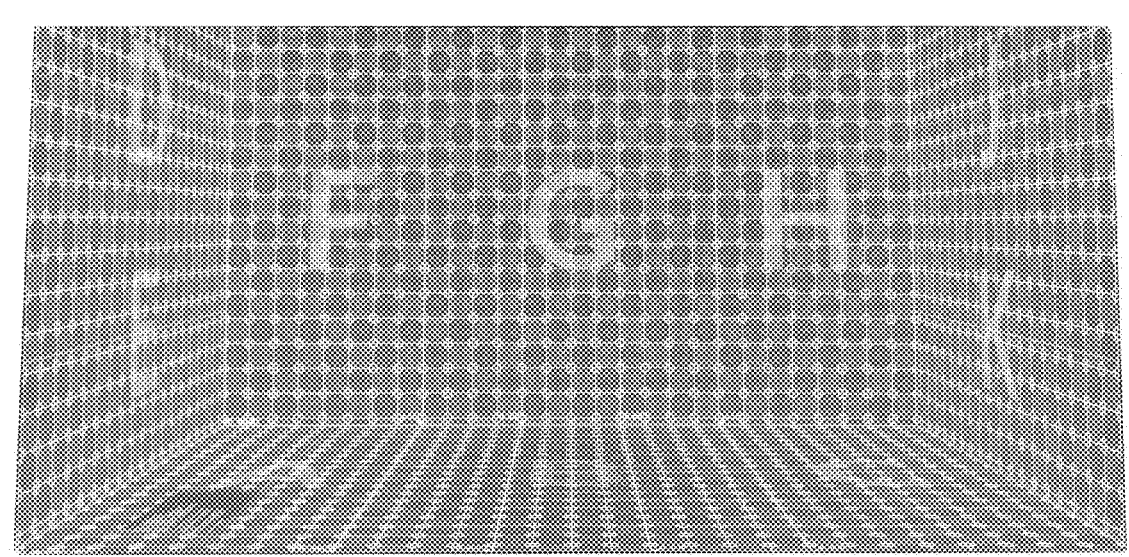
Figure 7B:
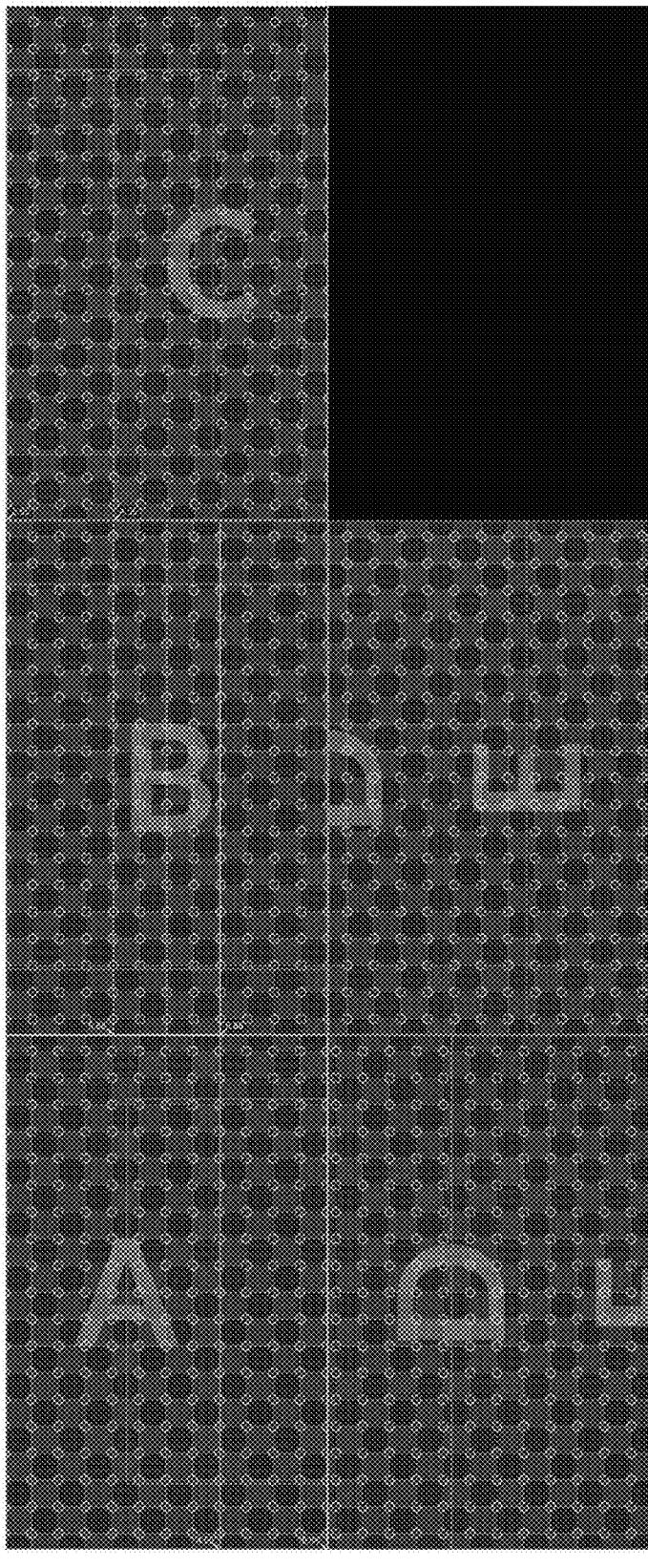
Figure 7C:
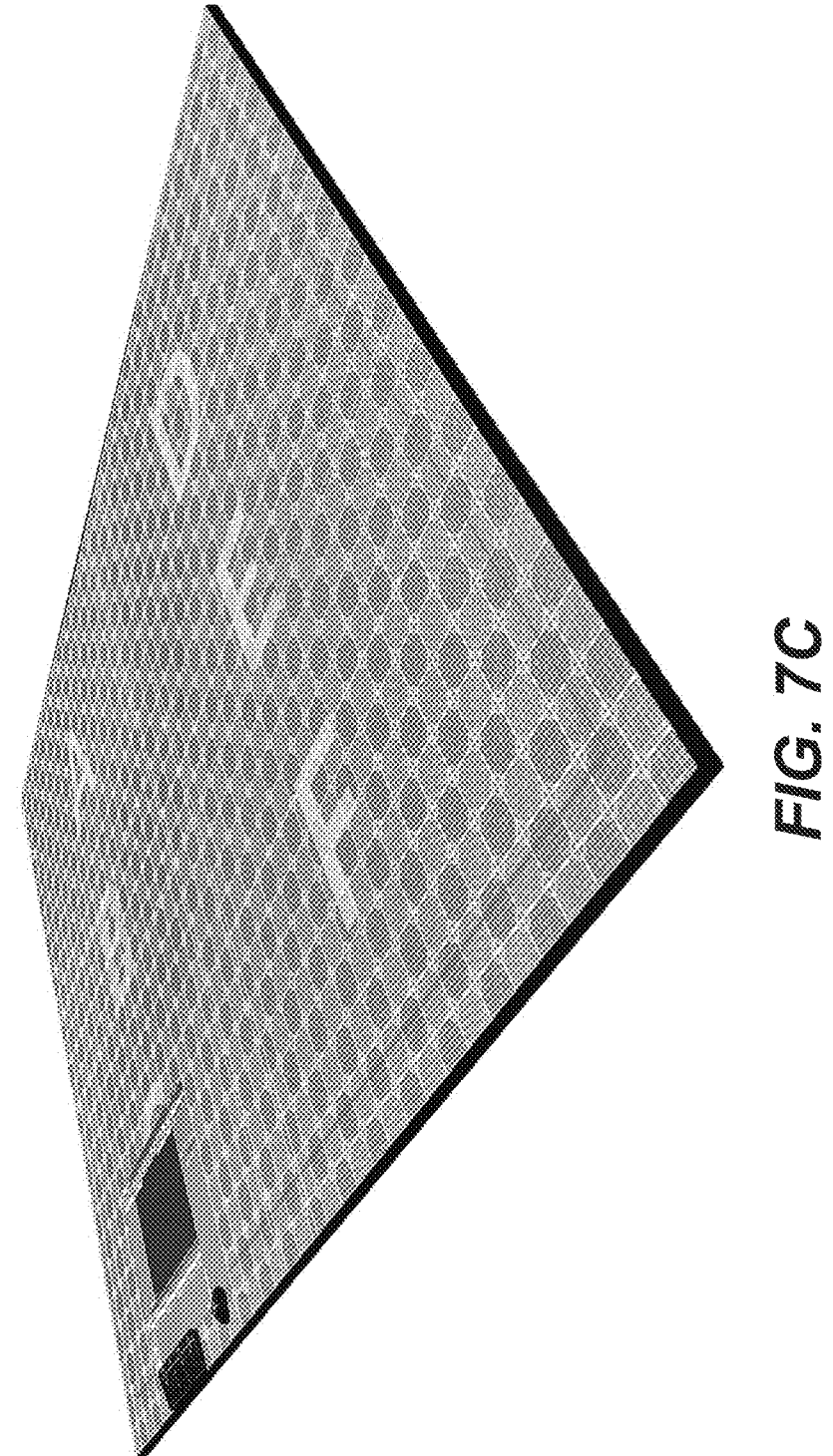
Figure 7D:

FIG. 6 depicts a flow chart illustrating a first example method 600 for projector system calibration. This method 600 may be performed by the system 100A of FIG. 1A or the system 300 of FIG. 3.

At operation 610, an electronic device (such as the rendering computing device 105 of FIGS. 1A and/or 3) may display one or more projector calibration images via one or more projectors. The projector calibration images may be one or more of the projector system calibration maps 700A-700D of FIGS. 7A-7D.

At operation 620, the electronic device may adjust one or more of the projectors based on the displayed projector calibration image. Adjustment of the one or more of the projectors may include controlling the projectors, signaling the projectors to adjust, providing instructions to adjust the projectors, and so on. Adjustment of the projectors may include controlling a zoom and/or a direction of projection and/or other property.

At operation 630, the electronic device may determine whether or not calibration is complete. If not, the flow may return to operation 610 where the electronic device continues displaying the projector calibration image. Otherwise, the flow may proceed to operation 640 where the electronic device may complete calibration.

In various examples, this example method 600 may be implemented as a group of interrelated software modules or components that perform various functions discussed herein. These software modules or components may be executed within a cloud network and/or edge network and/or by one or more computing devices, such as the rendering computing device 105 of FIGS. 1A and/or 3.

Although the example method 600 is illustrated and described as including particular operations performed in a particular order, it is understood that this is an example. In various implementations, various orders of the same, similar, and/or different operations may be performed without departing from the scope of the present disclosure.

For example, the above illustrates and describes the electronic device adjusting one or more of the projectors based on the displayed projector calibration image. However, it is understood that this is an example. In some implementations, the electronic device may provide instructions to adjust the projectors (such as by displaying the projector calibration image) instead of directly controlling the projectors. Various configurations are possible and contemplated without departing from the scope of the present disclosure.

FIGS. 7A-7D depict projector system calibration maps 700A-700D. These projector system calibration maps 700A-700D may be used with the system 100A of FIG. 1A or the system 300 of FIG. 3.

Projector system calibration map 700A may show projection alignment grids in use on a 4 surface volume. Projector system calibration map 700B may show projection alignment grids in use on a 4 surface volume arranged for half of the 10 projection channels (indicated as letters A-E) in use in the examples depicted in FIGS. 7A-7D. Projector system calibration map 700C may show projection alignment grids in use on a floor surface. Projector system calibration map 700D may show projection alignment grids built for use with a mosaic in a logical arrangement for six projection channels (indicated as letters A-F).

In the context of the projection alignment grids of the system calibration maps 700A-700D: letters may indicate projection channel (indicated as letters A-K), color borders may be projector frustums, blend zones may be indicated by frustum overlap, ley reference points may be marked, each large square may correspond to an amount of pixels (such as 200 pixels), each small square may correspond to a smaller amount of pixels (such as 25 pixels), and each circle may be a certain number of pixels in diameter (such as 80). Each grid may be custom for each projection surface. The projection alignment grids may function to provide alignment references, ensure even pixel distribution, ensure warp linearity, enable accurate calculation of exact scale, provide a blend zone/blanking reference, and so on.

Projection alignment grids and the reference points within the projection alignment grids may be used for multi-channel projection mapping. More significant may be the clear definition and distribution of pixel density as pixel density pertains to the validation of real-world scale in the context of mapping digital materials to projected surfaces.

Figure 8:
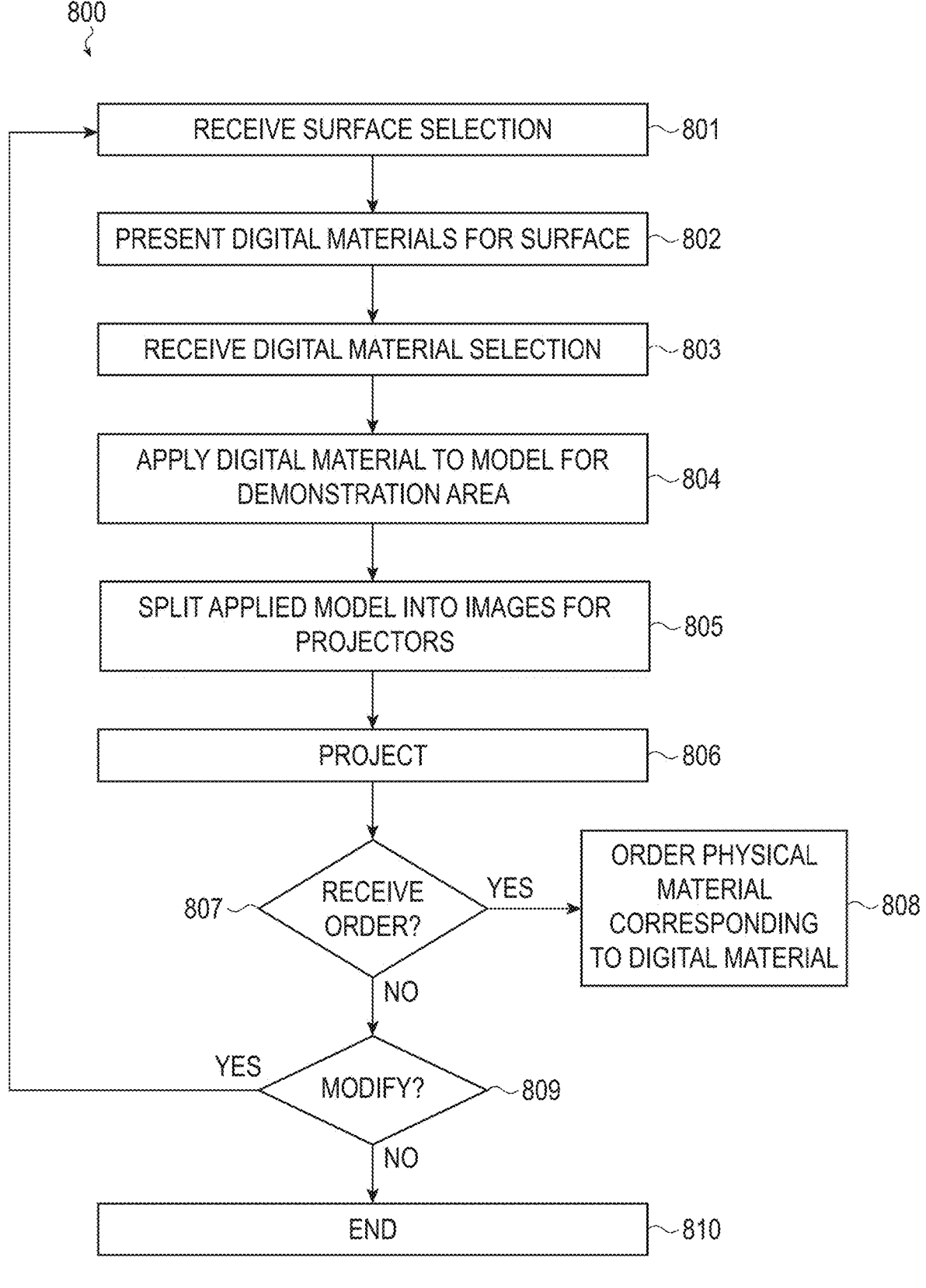
FIG. 8 depicts a flow chart illustrating a second example method for material visualization. This method may be performed by the system of FIG. 1A or the system of FIG. 3.

FIG. 8 depicts a flow chart illustrating a second example method 800 for material visualization. This method 800 may be performed by the system 100A of FIG. 1A or the system 300 of FIG. 3.

At operation 801, an electronic device (such as the rendering computing device 105 of FIGS. 1A and/or 3) may receive a surface selection. The surface selection may be received from a user via one or more user interfaces. The surface may be one or more portions of one or more walls, floors, and/or other objects (such as a couch, a counter, a cabinet, a refrigerator, a vanity, a shower, and so on).

At operation 802, the electronic device may present digital material options for the surface. In some implementations, the digital material options that are presented may be those that are available for the selected surface. For example, flooring options may be presented when a floor is selected.

At operation 803, the electronic device may receive a digital material selection. The digital material selection may be received from a user via one or more user interfaces. The digital material selection may be one of the digital material options presented in operation 802.

At operation 804, the electronic device may apply the digital material to a model for a demonstration area. At operation 805, the electronic device may split the applied model into images for a number of projectors. At operation 806, the electronic device may cause the projectors to display their respective split images.

At operation 807, the electronic device may determine whether or not an order is received. The order may be received from a user via one or more user interfaces. If so, the flow may proceed to operation 808 where the electronic device may order a physical design material corresponding to the digital material. Otherwise, the flow may proceed to operation 809.

At operation 809, the electronic device may determine whether or not to modify the applied model. If so, the flow may proceed to operation 801 where the electronic device may receive a surface selection. Otherwise, the flow may proceed to operation 810 and end.

In various examples, this example method 800 may be implemented as a group of interrelated software modules or components that perform various functions discussed herein. These software modules or components may be executed within a cloud network and/or edge network and/or by one or more computing devices, such as the rendering computing device 105 of FIGS. 1A and/or 3.

Although the example method 800 is illustrated and described as including particular operations performed in a particular order, it is understood that this is an example. In various implementations, various orders of the same, similar, and/or different operations may be performed without departing from the scope of the present disclosure.

For example, the above illustrates and describes receiving a surface selection, presenting digital material options for the selected surface, receiving a digital material selection, and then generating a visualization accordingly. However, it is understood that this is an example. In other implementations, digital material options may be presented, a digital material selection may be received, and then surface options to apply the digital material to may be presented. Various configurations are possible and contemplated without departing from the scope of the present disclosure.

Figure 9:
FIG. 9 depicts a third example system for material visualization.

FIG. 9 depicts a third example system 900 for material visualization. The system 900 may include one or more rendering computing devices 105 and a printed sheet system 170, which may include one or more printers 920 (such as a large format printer) and/or one or more laminators 921 (such as a large format laminator).

The system 900 may create one or more material sheets using one or more digital materials. Such a material sheet may be applied to one or more surfaces to visualize how a physical sample corresponding to the digital material would appear in a demonstration space.

For example, the rendering computing device 105 may use the printer 920 to print an image included in the digital material on an adhesive-backed sheet and then use the laminator 921 to apply one or more glossy and/or matte coatings (such as one or more polymers) to make the resulting laminated adhesive-backed sheet true to life of the glossiness properties, matte properties, and/or tactile properties (such as smoothness, stickiness, and so on) indicated in the digital material.

In some cases, the size specified for the material sheet may be different than that of the image included in the digital material. In such case, the rendering computing device 105 may crop the image if the image is larger or perform a process to generate a larger image from the image included in the digital material if the image is smaller. The latter process is discussed in more detail below.

Figure 10:
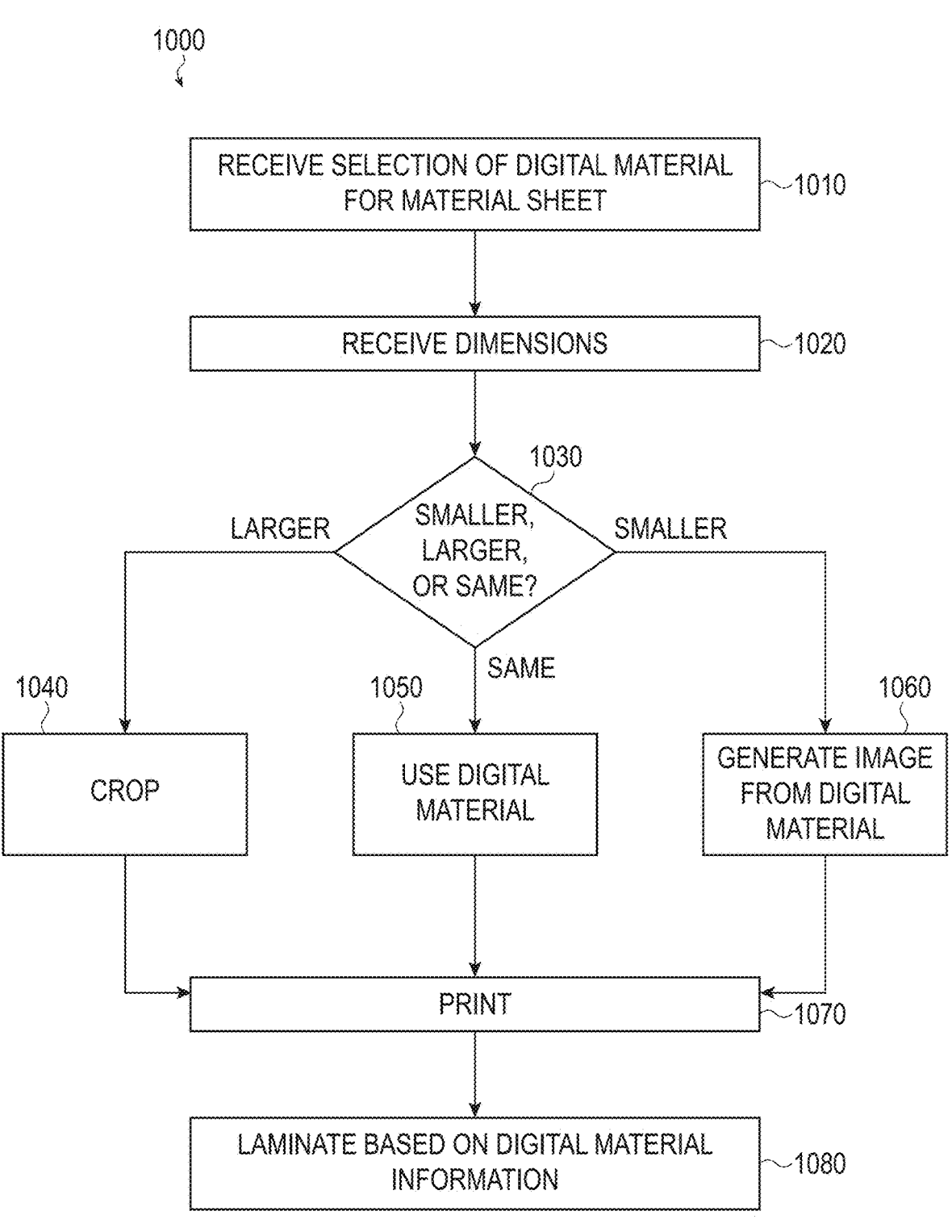
FIG. 10 depicts a flow chart illustrating a third example method for material visualization. This method may be performed by the system of FIG. 1A or the system of FIG. 9.

FIG. 10 depicts a flow chart illustrating a third example method 1000 for material visualization. This method 1000 may be performed by the system 100A of FIG. 1A or the system 900 of FIG. 9.

At operation 1010, an electronic device (such as the rendering computing device 105 of FIG. 1A) may receive a selection of a digital material for a material sheet.

At operation 1020, the electronic device may receive dimensions for the material sheet. The dimensions may be received from a user via one or more user interfaces.

At operation 1030, the electronic device may determine whether an image in the digital material is smaller, larger, or the same size than the received dimensions. If the image in the digital material is the same size as the received dimensions, the flow may proceed to operation 1050 where the electronic device may determine to use the digital material without adjustment before the flow proceeds to operation 1070 where the electronic device may use a printer to print the material sheet using the digital material and the specifications included therein. However, if the image in the digital material is larger than the received dimensions, the flow may proceed to operation 1040 where the electronic device may crop the image before the flow proceeds to operation 1070 where the electronic device may use a printer to print the material sheet using the cropped image and the specifications included in the digital material. Otherwise, if the image in the digital material is smaller than the received dimensions, the flow may proceed to operation 1060 where the electronic device may generate an image from the image included in the digital material before the flow proceeds to operation 1070 where the electronic device may use a printer to print the material sheet using the generated image and the specifications included in the digital material.

The material sheet may be an adhesive-backed material sheet. For example, the adhesive may be a pressure-sensitive adhesive mounted on the back of a substrate (such as acrylic, paper, cardboard, plastic, and so on) on which an image is printed (the top of which may be laminated with one or more coatings). In some examples, the adhesive may be covered by a backing that may be removed for use. In other examples, the adhesive-backed material sheet may be configured in a roll such that the adhesive from one layer of the roll contacts the printed image on the substrate of a lower layer of the roll.

The electronic device may generate the image from the image included in the digital material without rescaling the image by analyzing the appearance of the image included in the digital material, estimating based on the analysis of what the appearance of the image included in the digital material would be if the image included in the digital material extended beyond its dimensions to the received dimensions, generating one or more additional portions of the image included in the digital material based on the estimation, and combining the generated one or more additional portions of the image included in the digital material with the image included in the digital material. This combined image may be the image that the electronic device uses when the image in the digital material is smaller than the received dimensions.

For example, the digital material may be a digital material generated from a physical sample of a marble tile. The marble tile may be 3"×5" and have a vein pattern. However, the received dimensions may be 3"×9". In this situation, the electronic device may analyze the vein pattern, estimate what the vein pattern would look like in the portion of 3"×9" that extends beyond the 3"×5" of the image included in the digital material generated from the physical sample of a marble tile, generate an additional marble tile image portion based on the estimation of what that vein pattern would look like, and combine the image included in the digital material generated from the physical sample of a marble tile with the additional marble tile image portion.

This process of generating the combined image may not completely correspond (i.e., true to life) to the original piece of marble from which the physical sample from which the digital material was generated was cut. However, the combined image may still be more true to life than if the image included in the digital material were distorted by stretching, scaling, and/or other image manipulations to make the image included in the digital material fit the received dimensions. In this way, material sheets may be printed on demand at any dimensions from any digital material without the distortion that results from stretching, scaling, and/or other image manipulations.

After the electronic device may use a printer to print the material sheet, the flow may proceed to operation 1080 where the electronic device may use a laminator to apply one or more coatings to the material sheet according to specifications included in the digital material. For example, the coatings may be one or more glossy coatings or one or more matte coatings. Printing the image from the digital material or the adjusted image on an adhesive-backed material sheet and laminating and/or otherwise applying one or more glossy coatings, matte coatings, and/or other coatings may cause the printed adhesive-backed material sheet to interact with light like (i.e., look and feel like) the physical sample from which the digital material was generated.

In various examples, this example method 1000 may be implemented as a group of interrelated software modules or components that perform various functions discussed herein. These software modules or components may be executed within a cloud network and/or edge network and/or by one or more computing devices, such as the rendering computing device 105 of FIG. 1A.

Although the example method 1000 is illustrated and described as including particular operations performed in a particular order, it is understood that this is an example. In various implementations, various orders of the same, similar, and/or different operations may be performed without departing from the scope of the present disclosure.

For example, the above illustrates and describes one or more coatings being applied to the material sheet via lamination. However, it is understood that this is an example. In other implementations, other processes may be used to apply the coatings. Various configurations are possible and contemplated without departing from the scope of the present disclosure.

Figure 11:
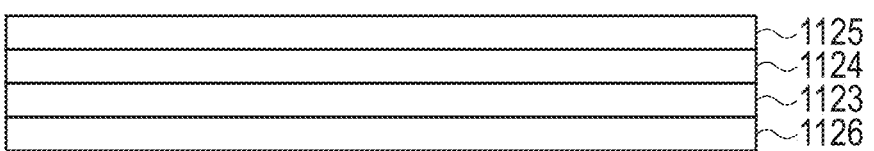
FIG. 11 depicts an example material sheet.

FIG. 11 depicts an example material sheet 1122. The material sheet 1122 may include a substrate 1124, such as acrylic, paper, cardboard, plastic, and so on, on which an image from a digital material is printed. The substrate 1124 may include an adhesive 1123, such as a pressure-sensitive adhesive. The adhesive 1123 may be covered by a backing 1126 that may be removed for use. The adhesive 1123 may enable the material sheet 1122 to be applied to a first surface, removed, and subsequently reapplied to one or more other surfaces. The substrate 1124 may be covered by one or more glossy and/or matte coatings 1125 (such as one or more polymers) to make the material sheet 1122 true to life of the glossiness properties, matte properties, and/or tactile properties (such as smoothness, stickiness, and so on) indicated in the digital material.

Figure 12:
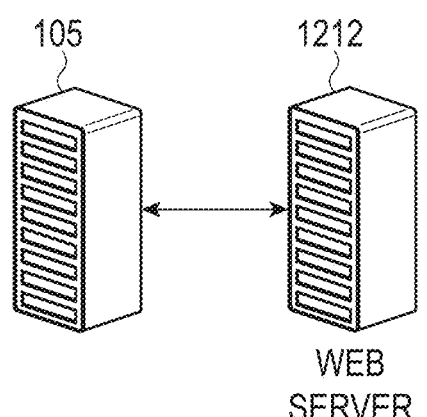
FIG. 12 depicts a fourth example system for material visualization.

FIG. 12 depicts a fourth example system 1200 for material visualization. The system 1200 may include one or more rendering computing devices 105 and one or more web servers 1212 (which may be a component of web system 180 of FIG. 1A).

The rendering computing device 105 may use one or more stored digital materials and/or one or more digital materials (which may be obtained from a repository computing device) to generate one or more visualizations for one or more websites. The rendering computing device 105 may do so by generating a model, applying a digital material to the model, adjusting the model for web output conditions, using a virtual camera to capture the adjusted model for web output, and providing the virtual camera captured adjusted model to the web server 1212, which may serve the virtual camera captured adjusted model via one or more PDPs.

Figure 13:
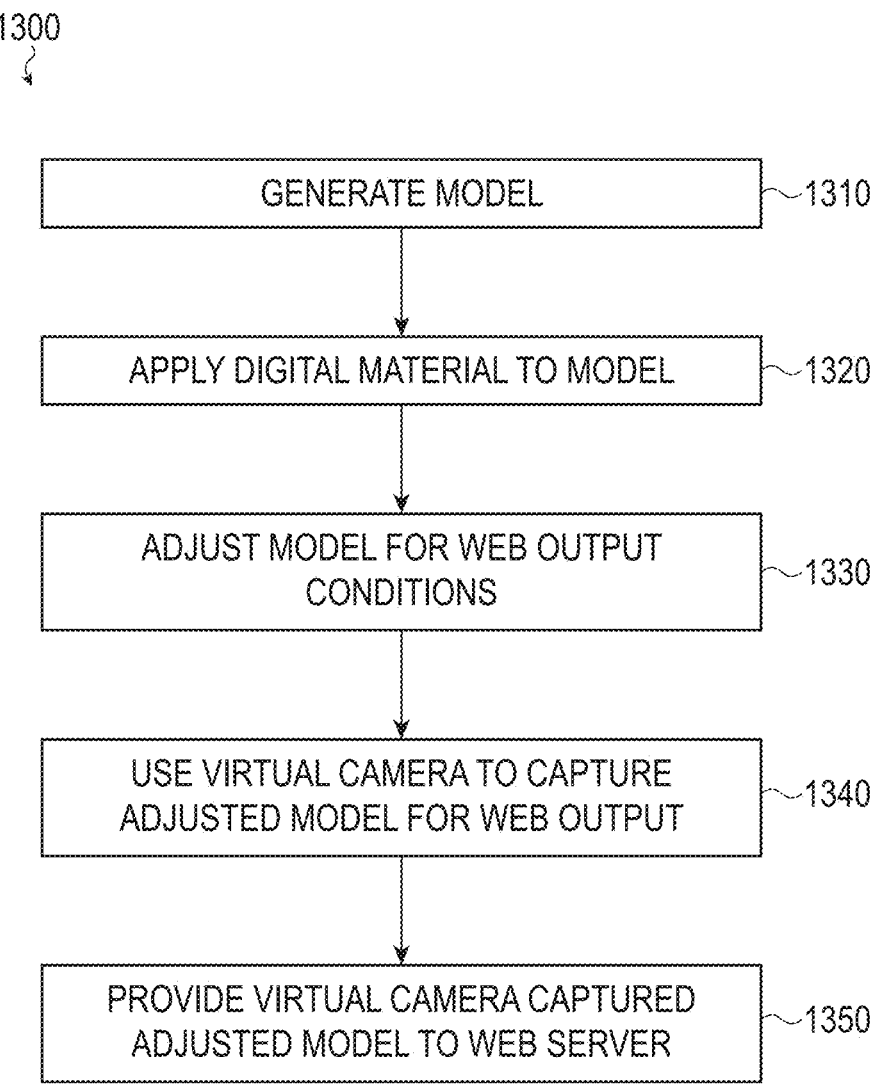
FIG. 13 depicts a flow chart illustrating a fourth example method for material visualization. This method may be performed by the system of FIG. 1A or the system of FIG. 12.

FIG. 13 depicts a flow chart illustrating a fourth example method 1300 for material visualization. This method 1300 may be performed by the system 100A of FIG. 1A or the system 1200 of FIG. 12.

At operation 1310, an electronic device (such as the rendering computing device 105 of FIG. 1A) may generate a model. The electronic device may select a perspective and generate the model from the perspective. At operation 1320, the electronic device may apply a digital material to at least a portion of the model.

At operation 1330, the electronic device may adjust the model for web output conditions. For example, the electronic device may adjust the model for the color space of the average monitor used to view web output. At operation 1340, the electronic device may use a virtual camera to capture the adjusted model for web output.

At operation 1350, the electronic device may provide the virtual camera captured adjusted model to one or more web servers. For example, the web server may serve one or more PDPs that correspond to the digital material and the electronic device may provide the virtual camera captured adjusted model to a web server to use for the PDP that corresponds to the digital material.

In various examples, this example method 1300 may be implemented as a group of interrelated software modules or components that perform various functions discussed herein. These software modules or components may be executed within a cloud network and/or edge network and/or by one or more computing devices, such as the rendering computing device 105 of FIG. 1A.

Although the example method 1300 is illustrated and described as including particular operations performed in a particular order, it is understood that this is an example. In various implementations, various orders of the same, similar, and/or different operations may be performed without departing from the scope of the present disclosure.

For example, the above describes the electronic device as generating the model and supplying the virtual camera captured adjusted model to one or more web servers. However, it is understood that this is an example. In some implementations, the electronic device may receive a request from a web server for a model to generate and may then generate the model and supply such to the requesting web server. Various configurations are possible and contemplated without departing from the scope of the present disclosure.

Figure 14:
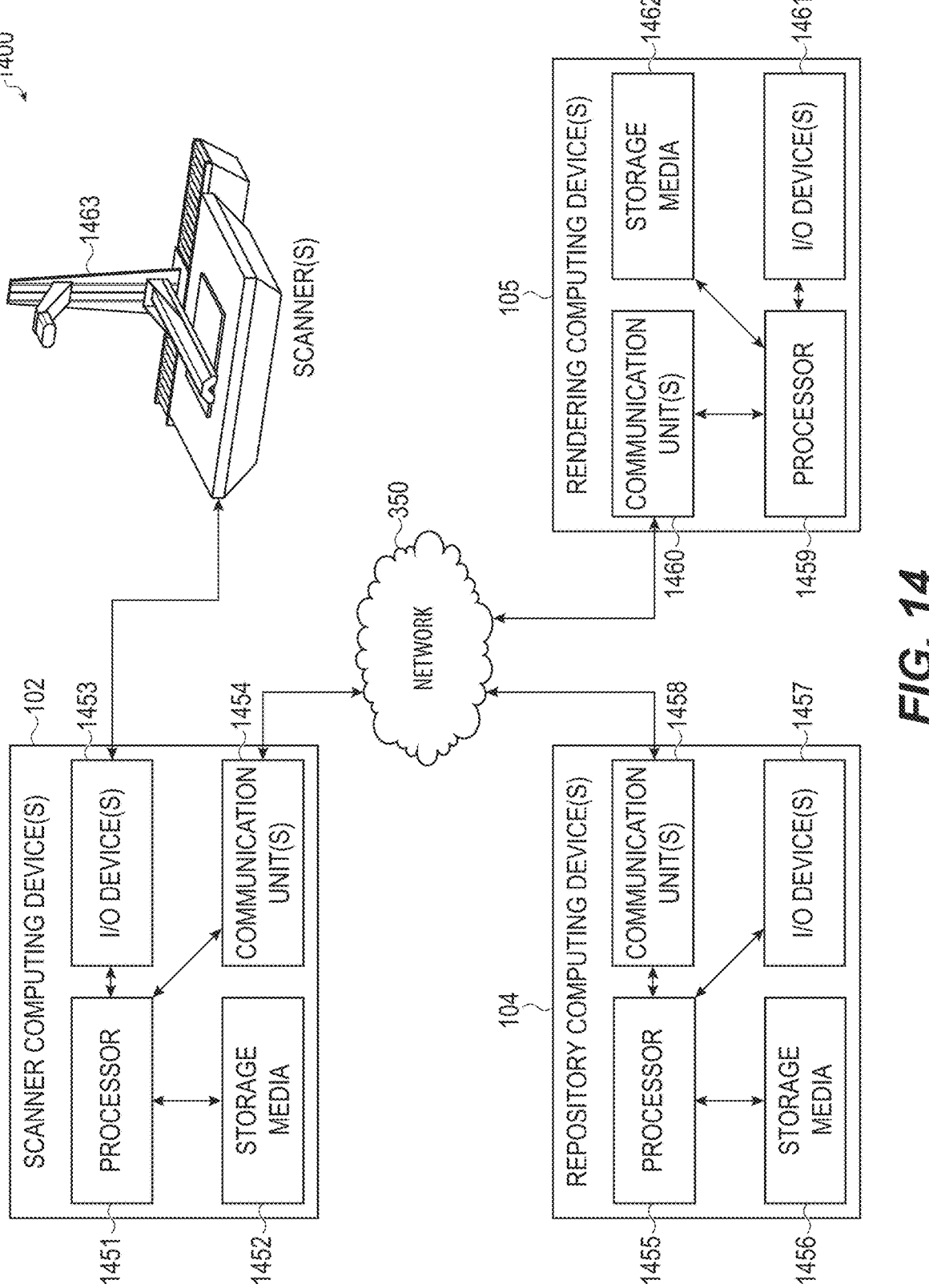
FIG. 14 depicts example relationships among example components, one or more of which may be used to implement the system of FIG. 1A, the system of FIG. 3, the system of FIG. 9, and/or the system of FIG. 12.

FIG. 14 depicts example relationships 1400 among example components, one or more of which may be used to implement the system 100A of FIG. 1A, the system 300 of FIG. 3, the system 900 of FIG. 9, and/or the system 1200 of FIG. 12.

The scanner computing device 102 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The scanner computing device 102 may include one or more processors 1451 and/or other processing units and/or controllers, one or more non-transitory storage media 1452 (which may take the form of, but is not limited to, a magnetic storage medium; optical storage medium; magneto-optical storage medium; read only memory; random access memory; erasable programmable memory; flash memory; and so on), one or more communication units 1454, input and/or output components 1453 (such as one or more keyboards, mice, track pads, touch screens, displays, printers, microphones, graphics cards, and so on), and/or other components. The processor 1451 may execute instructions stored in the non-transitory storage medium 1452 to perform various functions. Such functions may include scanning physical materials, creating digital materials, communicating with the rendering computing device 105 and/or the repository computing device 104 via one or more networks 350, control and/or interface with one or more scanners 1463, and so on. Alternatively and/or additionally, the scanning computing device 102 may involve one or more memory allocations configured to store at least one executable asset and one or more processor allocations configured to access the one or more memory allocations and execute the at least one executable asset to instantiate one or more processes and/or services, such as one or more rendering services, web services, printing services, ordering services, and so on.

Similarly, rendering computing device 105 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The rendering computing device 105 may include one or more processors 1459 and/or other processing units and/or controllers, one or more non-transitory storage media 1462 (which may take the form of, but is not limited to, a magnetic storage medium; optical storage medium; magneto-optical storage medium; read only memory; random access memory; erasable programmable memory; flash memory; and so on), one or more communication units 1460, input and/or output components 1461 (such as one or more keyboards, mice, track pads, touch screens, displays, printers, microphones, graphics cards, and so on), and/or other components. The processor 1459 may execute instructions stored in the non-transitory storage medium 1462 to perform various functions. Such functions may include generating one or more models, applying images from digital materials to one or more surfaces of the models, communicating with the scanner computing device 102 and/or the repository computing device 104 via one or more networks 350, and so on. Alternatively and/or additionally, the rendering computing device 105 may involve one or more memory allocations configured to store at least one executable asset and one or more processor allocations configured to access the one or more memory allocations and execute the at least one executable asset to instantiate one or more processes and/or services, such as one or more services, and so on.

Likewise, the repository computing device 104 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The scanner computing device 102 may include one or more processors 1455 and/or other processing units and/or controllers, one or more non-transitory storage media 1456 (which may take the form of, but is not limited to, a magnetic storage medium; optical storage medium; magneto-optical storage medium; read only memory; random access memory; erasable programmable memory; flash memory; and so on), one or more communication units 1458, input and/or output components 1457 (such as one or more keyboards, mice, track pads, touch screens, displays, printers, microphones, graphics cards, and so on), and/or other components. The processor 1455 may execute instructions stored in the non-transitory storage medium 1456 to perform various functions. Such functions may include storing digital materials, communicating with the scanner computing device 102 and/or the rendering computing device 105 via one or more networks 350, and so on. Alternatively and/or additionally, the repository computing device 104 may involve one or more memory allocations configured to store at least one executable asset and one or more processor allocations configured to access the one or more memory allocations and execute the at least one executable asset to instantiate one or more processes and/or services, such as one or more services, and so on.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, track pads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Although FIG. 14 is illustrated and described as including particular components arranged in a particular configuration, it is understood that this is an example. In a number of implementations, various configurations of various components may be used without departing from the scope of the present disclosure.

For example, FIG. 14 is illustrated and described as including the scanner computing device 102. However, it is understood that this is an example. In various implementations, the rendering computing device 105 may perform the functions attributed above to the scanner computing device 102 and the scanner computing device 102 may be omitted. Various configurations are possible and contemplated without departing from the scope of the present disclosure.

Although the figures of the present application depict projection onto two-dimensional surfaces it is understood that these figures are examples. In various implementations, one or more images may be projected onto various three-dimensional surfaces without departing from the scope of the present disclosure. In some such implementations, image blending and/or other processes may be performed on the one or more images to prevent and/or reduce distortion related to projecting onto the various three-dimensional surfaces. Image blending within the context of the three dimensional mapping may involve treating multiple projectors as single output source for the represented image. Calculations for how the represented image conforms to the various surfaces, lighting conditions, and so on when treating the multiple projectors as a single output source for the represented image may be performed by one or more processors at runtime. This may enable delivering of a unified experience.

As discussed above, a visualization system in accordance with the present disclosure, such as the system 100A of FIG. 1A and/or the system 300 of FIG. 3, may generate a model of a demonstration area from a perspective. Such a visualization system may not know the perspective from which the demonstration area will be viewed. In such a situation, the visualization system may assume the perspective from which the demonstration area will be viewed and use such to generate the model. For example, the visualization system may assume the perspective from which the demonstration area will be viewed will be from the middle of in front of the demonstration area looking forward at the demonstration area. As such, the visualization system may generate any and all models from this perspective.

However, as also discussed above, people viewing the projection on the demonstration area from perspectives other than the one from which the model was generated will result in the projection appearing less true to life than it otherwise would. For example, some sidewalk art appears to be three-dimensional when viewed from the viewpoint from which the perspective is generated and two-dimensional from other viewpoints. People may view the demonstration area from perspectives other than the intended perspective from which the model was generated, and/or may move while viewing.

To overcome these issues, some visualization systems in accordance with the present disclosure, such as the system 100A of FIG. 1A and/or the system 300 of FIG. 3, may know the perspective from which the demonstration area is being viewed and may generate models from that perspective accordingly. Further, in some implementations of such examples, the visualization system may track the person and/or changes in his perspective and/or where he is looking. The visualization system may update the model accordingly.

By way of illustration, a person may be wearing glasses that have one or more embedded RFID (radio frequency identification) tags and/or other signal emitters. One or more sensors (such as the sensor 312 of FIG. 3) may use the RFID tags to triangulate the person's position, track the person's movement, and/or track changes in the person's perspective and/or where the person is looking. The visualization system may generate and/or update one or more models using such data to account for the person's position, movement, and/or changes in the person's perspective and/or where the person is looking.

However, it is understood that this is an example. In other implementations, the glasses may include a receiver that is operable to receive one or more signals from one or more signal emitters and the person's position, movement, and/or changes in the person's perspective and/or where the person is looking may be calculated using data from the receiver regarding the signals received from the one or more signal emitters. Various configurations are possible and contemplated without departing from the scope of the present disclosure.

By way of another example, the sensor 312 of FIG. 3 may be a camera that may be used to determine the person's position, movement, and/or changes in the person's perspective and/or where the person is looking. In yet another example, the sensor 312 of FIG. 3 may be one or more motion sensors positioned around the example demonstration area 315 that may be used to determine the person's position, movement, and/or changes in the person's perspective. In still another example, the visualization system may receive user input (such as from a mobile device operated by the person) indicating the person's position, movement, and/or changes in the person's perspective and/or where the person is looking. Various configurations are possible and contemplated without departing from the scope of the present disclosure.

Figure 15A:
FIG. 15A depicts an example demonstration area viewed by a person from a perspective.

By way of illustration, FIG. 15A depicts an example demonstration area 315 viewed by a person 1520 from a perspective 1522. The example demonstration area 315 includes a first wall 313A, a second wall 313B, a third wall 313C, and a floor 314.

A visualization system in accordance with the present disclosure, such as the system 100A of FIG. 1A and/or the system 300 of FIG. 3, may determine (such as by detecting an RFID tag in glasses 1521 worn by the person 1520) and/or otherwise obtain information regarding the position of the person 1520, where the person 1520 is looking, movement of the person 1520, and/or changes in the perspective 1522 of the person 1520. For example the visualization system may determine that the person 1520 is positioned as shown in FIG. 15A.

Figure 15B:
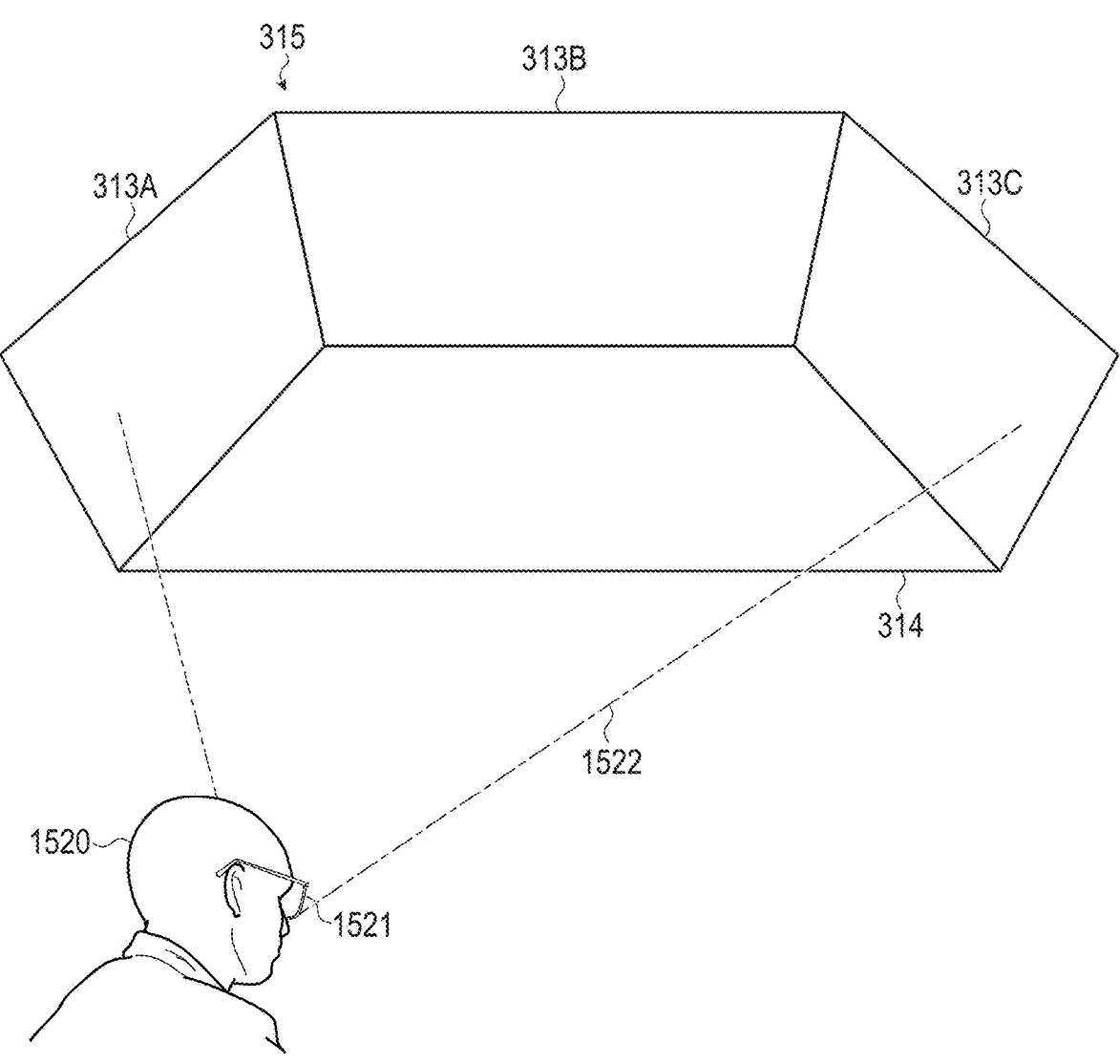
FIG. 15B depicts the person moving to view the example demonstration area from another perspective.

The visualization system may then generate a model of the example demonstration area 315 using that information, apply one or more digital materials to one or more surfaces of the model, adjust the model for one or more conditions of the example demonstration area 315, split the adjusted model into images for respective projector zones, and provide the split images to respective projectors associated with the respective projector zones. When subsequent such information indicates a change in the position of the person 1520, where the person 1520 is looking, movement of the person 1520, and/or changes in the perspective 1522 of the person 1520, such as is shown in FIG. 15B after the person has moved from the right side of the example demonstration area 315 to the left side of the example demonstration area 315, the visualization system may update the model, update the projected images, and so on.

Figure 16:
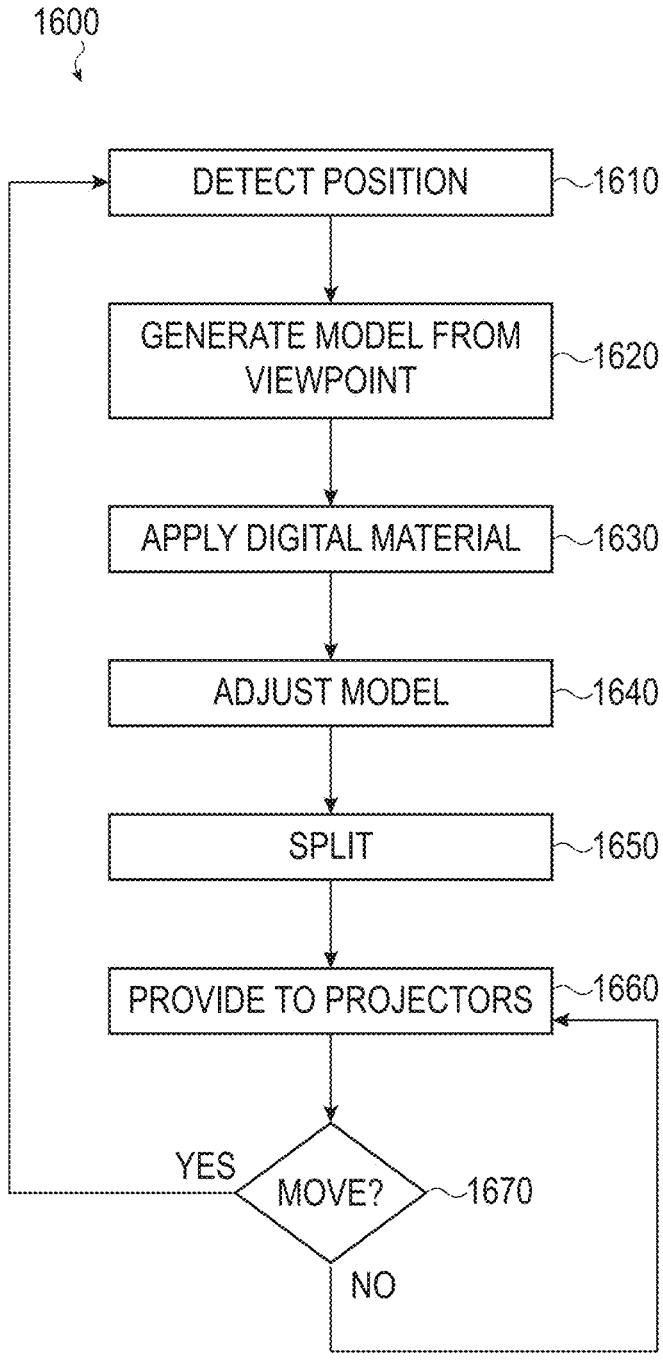
FIG. 16 depicts a flow chart illustrating a fourth example method for material visualization. This method may be performed by the system of FIG. 1A or the system of FIG. 3.

FIG. 16 depicts a flow chart illustrating a fourth example method 1600 for material visualization. This method 1600 may be performed by the system 100A of FIG. 1A or the system 300 of FIG. 3.

At operation 1610, an electronic device (such as the rendering computing device 105 of FIGS. 1A and/or 3) may detect a position of a person. The position may include the location of the person, where the person is looking, the perspective of the person, and so on.

By way of illustration, a person may be wearing glasses that have one or more embedded RFID (radio frequency identifier) tags and/or other signal emitters. One or more sensors (such as the sensor 312 of FIG. 3) may use the RFID tags to triangulate the person's position, track the person's movement, and/or track changes in the person's perspective and/or where the person is looking.

However, it is understood that this is an example. In other implementations, the glasses may include a receiver that is operable to receive one or more signals from one or more signal emitters and the person's position, movement, and/or changes in the person's perspective and/or where the person is looking may be calculated using data from the receiver regarding the signals received from the one or more signal emitters. Various configurations are possible and contemplated without departing from the scope of the present disclosure.

By way of another example, the sensor 312 of FIG. 3 may be a camera that may be used to determine the person's position, movement, and/or changes in the person's perspective and/or where the person is looking. In yet another example, the sensor 312 of FIG. 3 may be one or more motion sensors positioned around the example demonstration area 315 that may be used to determine the person's position, movement, and/or changes in the person's perspective. In still another example, the visualization system may receive user input (such as from a mobile device operated by the person) indicating the person's position, movement, and/or changes in the person's perspective and/or where the person is looking. Various configurations are possible and contemplated without departing from the scope of the present disclosure.

At operation 1620, the electronic device may generate a model of a demonstration area from a viewpoint corresponding to the person's position. At operation 1630, the electronic device may apply one or more selected digital materials to at least part of one or more surfaces of the model. At operation 1640, the electronic device may adjust the applied model for one or more demonstration area conditions. At operation 1650, the electronic device may split the adjusted applied model into images for one or more projector zones.

At operation 1660, the electronic device may provide the respective images to the respective projectors. This may cause the projectors to project the images into the demonstration area, generating a true to life visualization of the digital materials applied to the model generated according to the person's position.

At operation 1670, the electronic device may determine whether or not the person moves. If so, the flow may return to operation 1610 where the person's position is again detected. Otherwise, the flow may return to operation 1660 where the electronic device may continue providing the images to the projectors.

In various examples, this example method 1600 may be implemented as a group of interrelated software modules or components that perform various functions discussed herein. These software modules or components may be executed within a cloud network and/or edge network and/or by one or more computing devices, such as the rendering computing device 105 of FIGS. 1A and/or 3.

Although the example method 1600 is illustrated and described as including particular operations performed in a particular order, it is understood that this is an example. In various implementations, various orders of the same, similar, and/or different operations may be performed without departing from the scope of the present disclosure.

For example, the above illustrates and describes detecting the position of the person. However, it is understood that this is an example. In various implementations, the electronic device may be informed of the position of the person, such as by user input provided by the person and/or one or more other people. Various configurations are possible and contemplated without departing from the scope of the present disclosure.

Another possible issue with perspective in visualization systems is that multiple people may be viewing a projection on a demonstration area. In such a situation, it is highly unlikely that more than one person would be able to view the projection from the viewpoint that the model was generated. As a result, the visualization will seem less true to life, and for at least one person more than another. This may lead to inconsistent output.

To overcome these issues, some visualization systems in accordance with the present disclosure, such as the system 100A of FIG. 1A and/or the system 300 of FIG. 3, may determine the positions of multiple people, generate multiple versions of a model according to the positions, and provide the multiple versions to projectors in such a way that the respective versions are viewed by the respective people.

By way of example, the visualization system may generate a first model for a first person's position, generate a second model for a second person's position, polarize the two models differently, and then provide the differently polarized models to projectors for projection. The two people may be each wearing glasses that have lenses that are polarized for their respective model. In this way, they would only see their model (which is generated for their perspective) even though both are projected. In this way, the projection would appear true to life for both people despite the differences in perspective. Various configurations are possible and contemplated without departing from the scope of the present disclosure.

In another example, the visualization system may generate a first model for a first person's position, generate a second model for a second person's position, and then provide the models to projectors for projection in alternating frames. The two people may be each wearing glasses that have blinking lenses that match the frames of their respective model so that they can view the frames of their respective model and do not see the frames of the other person's model. Various configurations are possible and contemplated without departing from the scope of the present disclosure.

Figure 17A:
FIG. 17A depicts an example demonstration area viewed by a first person from a first perspective and a second person from a second perspective.

FIG. 17A depicts an example demonstration area 1700 viewed by a first person 1720A from a first perspective 1722A and a second person 1720B from a second perspective 1722B. The example demonstration area 315 includes a first wall 313A, a second wall 313B, a third wall 313C, and a floor 314.

A visualization system in accordance with the present disclosure, such as the system 100A of FIG. 1A and/or the system 300 of FIG. 3, may determine (such as by detecting an RFID tag in glasses 1721A worn by the first person 1720A and/or glasses 1721B worn by the second person 1720B) and/or otherwise obtain information regarding the position of the first person 1720A and/or the second person 1720B, where the first person 1720A and/or the second person 1720B is looking, movement of the first person 1720A and/or the second person 1720B, and/or changes in the first perspective 1722A of the first person 1720A and/or the second perspective 1722B of the second person 1720B. For example the visualization system may determine that the first person 1720A and the second person 1720B are positioned as shown in FIG. 17A.

The visualization system may then generate versions of a model of the example demonstration area 315 using the information for the first person 1720A and the second person 1720B, apply one or more digital materials to one or more surfaces of the versions of the model, adjust the versions of the model for one or more conditions of the example demonstration area 315, split the adjusted versions of the model into images for respective projector zones, and provide the split images to respective projectors associated with the respective projector zones. The visualization system may be configured that the first person 1720A sees the version of the model generated for her first perspective 1722A and the second person 1720B sees the version of the model generated for his second perspective 1722B.

By way of example, the visualization system may polarize the versions of the models differently and then provide the differently polarized versions of the models to projectors for projection. The glasses 1721A, 1721B may be respectively polarized so that the first person 1720A sees the version of the model generated for her first perspective 1722A and the second person 1720B sees the version of the model generated for his second perspective 1722B. Various configurations are possible and contemplated without departing from the scope of the present disclosure.

In another example, the visualization system may generate a first model for a first person's position, generate a second model for a second person's position, and then provide the models to projectors for projection in alternating frames. The glasses 1721A, 1721B may have blinking lenses respectively configured to match the frames of the respective model so that the first person 1720A sees the version of the model generated for her first perspective 1722A and the second person 1720B sees the version of the model generated for his second perspective 1722B. Various configurations are possible and contemplated without departing from the scope of the present disclosure.

Figure 17B:
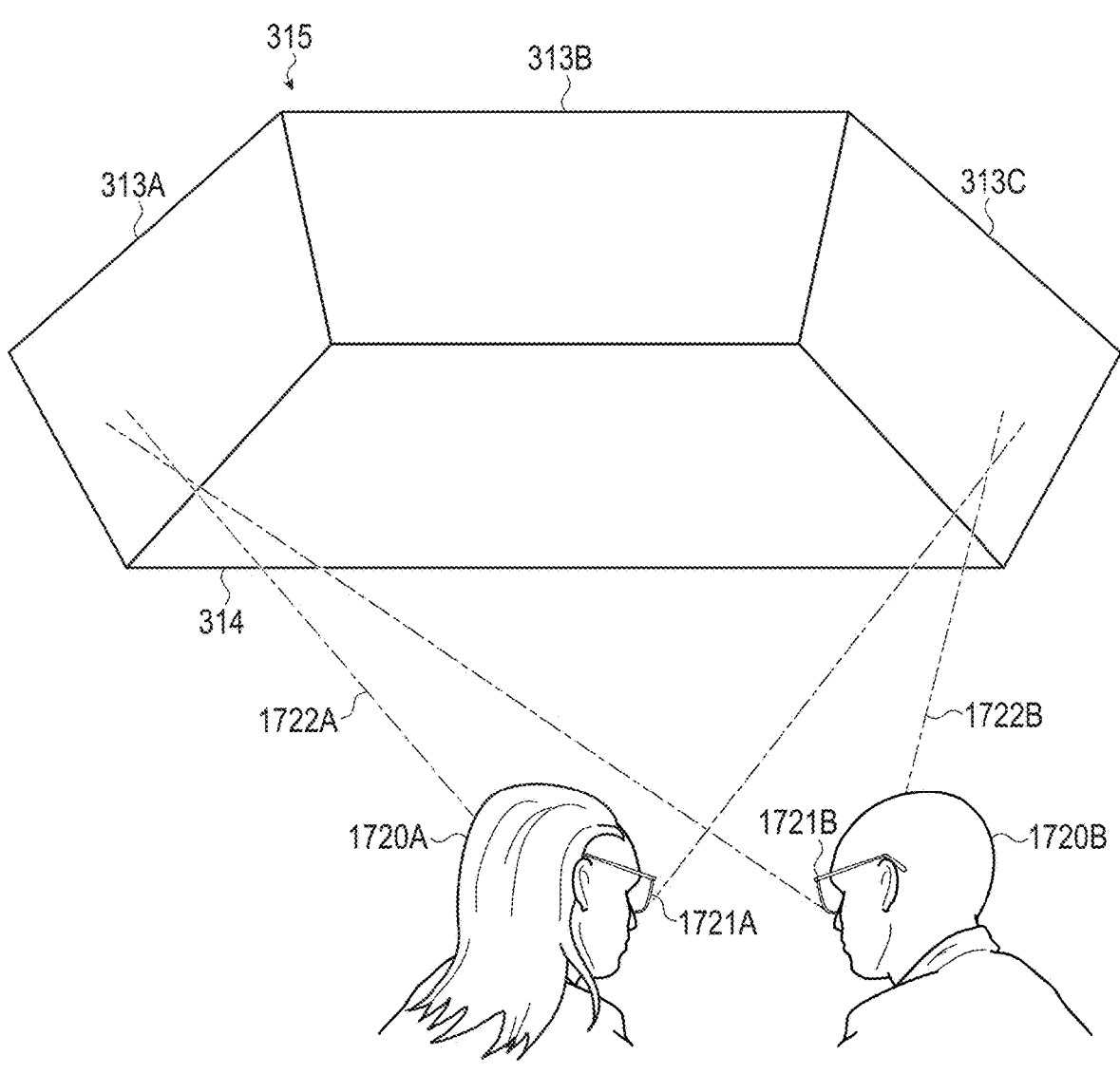
FIG. 17B depicts the second person moving to view the example demonstration area from a third perspective.
Figure 17C:
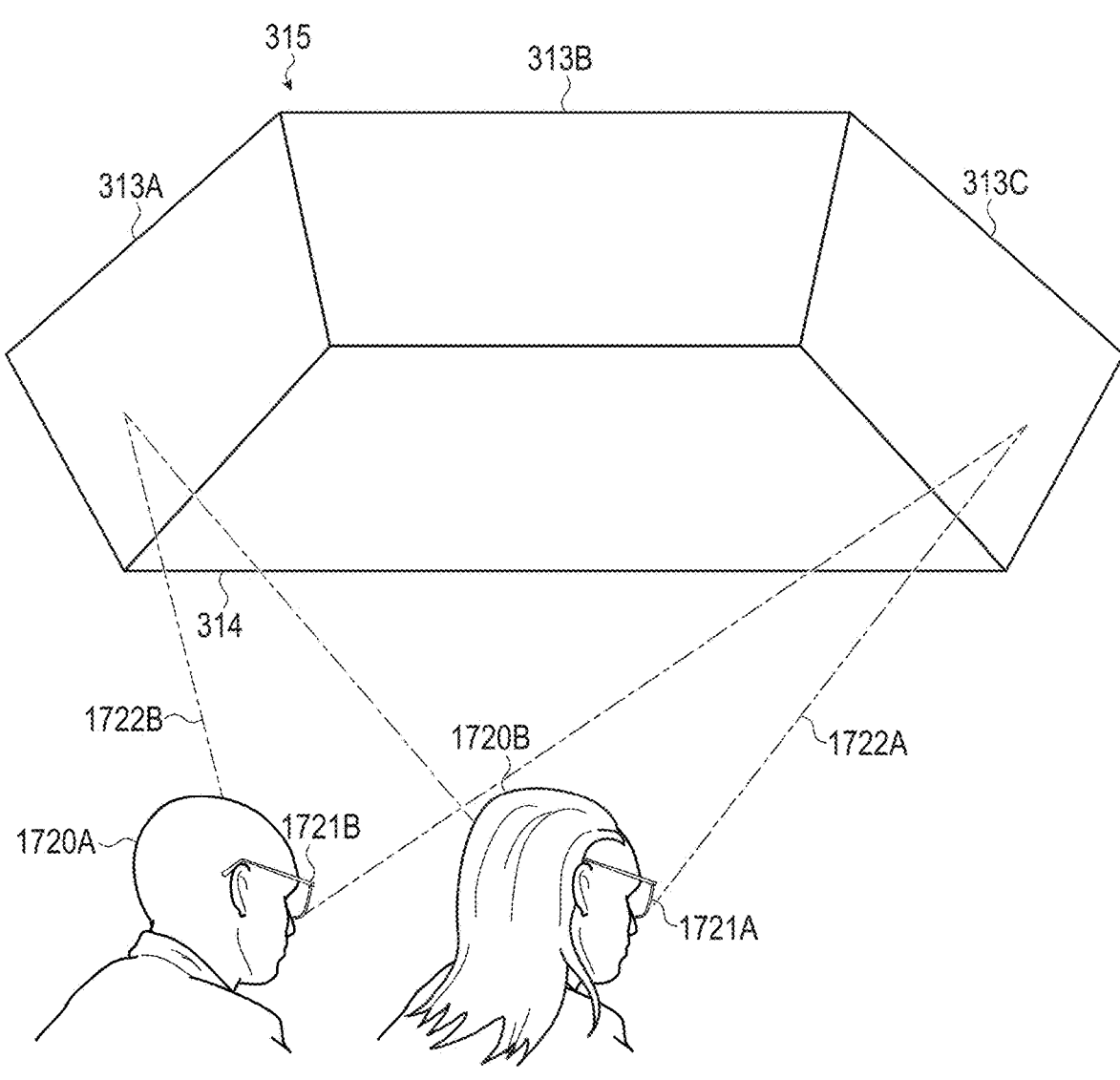
FIG. 17C depicts the first person moving to view the example demonstration area from a fourth perspective.

When subsequent such information indicates a change in the position of the first person 1720A, where the first person 1720A is looking, movement of the first person 1720A, and/or changes in the first perspective 1722A of the first person 1720A, such as is shown in FIG. 17B after the person has moved from the left side of the example demonstration area 315 to the middle of the example demonstration area 315, the visualization system may update the respective version of the model, update the projected images, and so on. Further, when subsequent such information indicates a change in the position of the second person 1720B, where the second person 1720B is looking, movement of the second person 1720B, and/or changes in the second perspective 1722B of the second person 1720B, such as is shown in FIG. 17C after the person has moved from the right side of the example demonstration area 315 to the left side of the example demonstration area 315, the visualization system may update the respective version of the model, update the projected images, and so on.

Figure 18:
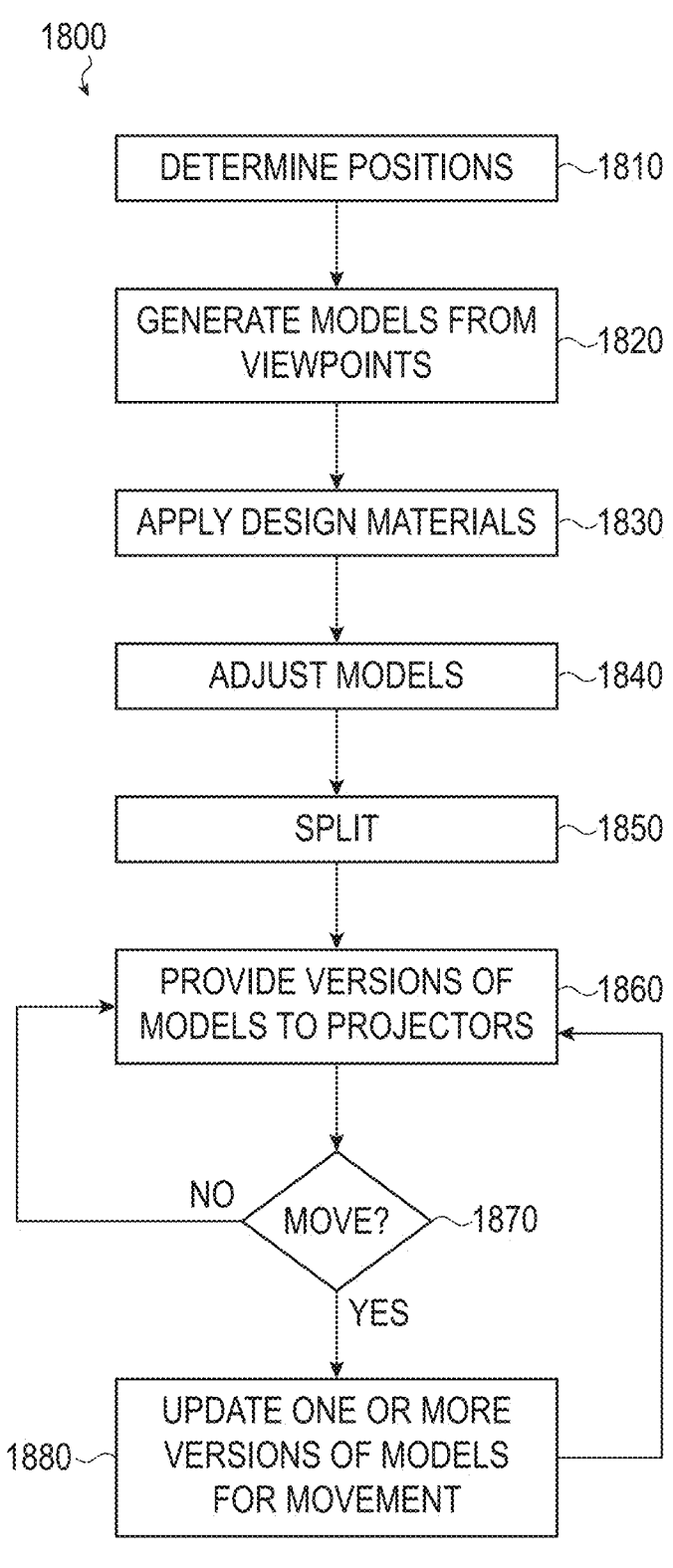
FIG. 18 depicts a flow chart illustrating a fifth example method for material visualization. This method may be performed by the system of FIG. 1A or the system of FIG. 3.

FIG. 18 depicts a flow chart illustrating a fifth example method 1800 for material visualization. This method 1800 may be performed by the system 100A of FIG. 1A or the system 300 of FIG. 3.

At operation 1810, an electronic device (such as the rendering computing device 105 of FIGS. 1A and/or 3) may detect positions of multiple people. The positions may include the location of one or more of the people, where one or more of the people are looking, the perspective of one or more of the people, and so on.

By way of illustration, the person may be wearing glasses that have one or more embedded RFID (radio frequency identifier) tags and/or other signal emitters. One or more sensors (such as the sensor 312 of FIG. 3) may use the RFID tags to triangulate the position of one or more of the people, track the movement of one or more of the people, and/or track changes in the perspective of one or more of the people and/or where one or more of the people are looking.

However, it is understood that this is an example. In other implementations, the glasses may include a receiver that is operable to receive one or more signals from one or more signal emitters and the position, movement, and/or changes in the perspective of one or more of the people and/or where one or more of the people are looking may be calculated using data from the receiver regarding the signals received from the one or more signal emitters. Various configurations are possible and contemplated without departing from the scope of the present disclosure.

By way of another example, the sensor 312 of FIG. 3 may be a camera that may be used to determine the position, movement, and/or changes in the perspective of one or more of the people and/or where one or more of the people are looking. In yet another example, the sensor 312 of FIG. 3 may be one or more motion sensors positioned around the example demonstration area 315 that may be used to determine the position, movement, and/or changes in the perspective of one or more of the people. In still another example, the visualization system may receive user input (such as from a mobile device operated by one or more of the people) indicating the position, movement, and/or changes in the perspective of one or more of the people and/or where one or more of the people are looking. Various configurations are possible and contemplated without departing from the scope of the present disclosure.

At operation 1820, the electronic device may generate versions of a model of an example demonstration area from viewpoints corresponding to each of the people's positions. At operation 1830, the electronic device may apply one or more selected digital materials to at least part of one or more surfaces of the versions of the model. At operation 1840, the electronic device may adjust the applied model for one or more demonstration area conditions. At operation 1850, the electronic device may split the adjusted applied versions of the model into images for one or more projector zones.

At operation 1860, the electronic device may provide the respective images to the respective projectors in such a way that the respective people see the respective model generated from their viewpoint. This may cause the projectors to project the images into the demonstration area, generating a true to life visualization of the digital materials applied to the respective model generated according to the respective perspective of the respective person.

By way of example, the electronic device may polarize the versions of the models differently and then provide the differently polarized versions of the models to projectors for projection. The people may wear glasses that are respectively polarized so that each person sees the model generated from their perspective. In another example, the electronic device may provide the models to projectors for projection in alternating frames. The people may wear glasses that may have blinking lenses respectively configured to match the frames of the respective model so that each person sees the model generated from their perspective. Various configurations are possible and contemplated without departing from the scope of the present disclosure.

At operation 1870, the electronic device may determine whether or not one or more of the people move. If so, the flow may proceed to operation 1880 where the electronic device updates one or more versions of the model for the movement before the flow returns to operation 1860 where the electronic device provides updated images for the updated model to the projectors. Otherwise, the flow may return directly to operation 1860 where the electronic device may continue providing the images to the projectors.

In various examples, this example method 1800 may be implemented as a group of interrelated software modules or components that perform various functions discussed herein. These software modules or components may be executed within a cloud network and/or edge network and/or by one or more computing devices, such as the rendering computing device 105 of FIGS. 1A and/or 3.

Although the example method 1800 is illustrated and described as including particular operations performed in a particular order, it is understood that this is an example. In various implementations, various orders of the same, similar, and/or different operations may be performed without departing from the scope of the present disclosure.

For example, the above illustrates and describes providing the versions of the model to the same projectors. However, it is understood that this is an example. In various implementations, the electronic device may provide the versions of the models to different perspectives. This may enable the full pixel output of the respective projectors to be used for each of the versions of the model. Various configurations are possible and contemplated without departing from the scope of the present disclosure.

By way of another example, the above illustrates and describes applying the same digital material to the versions of the model. However, it is understood that this is an example. In some implementations, different digital materials could be applied to the different versions of the model instead of just generating the different versions from different perspectives. Various configurations are possible and contemplated without departing from the scope of the present disclosure.

Although the above illustrates and describes use of glasses that have one or more embedded RFID (radio frequency identification) tags and/or other signal emitters and/or other sensors (such as the sensor 312 of FIG. 3) to triangulate the person's position, track the person's movement, track changes in the person's perspective and/or where the person is looking, determine the person's perspective and/or where the person is looking, and so on in three dimensions, it is understood that these are examples. In other examples, such information may be determined in two dimensions (such as length and width) whereas information on the third dimension (such as height) may be assumed. For example, RFID not included in glasses may be used to determine where a person is standing and an average height (such as five and a half feet tall) may be inferred. By way of another example, a pressure sensor in a floor may be used to determine where a person is standing and information provided about the person's height may be used instead of determining the person's height.

In various implementations, a system may include a non-transitory storage medium that stores instructions and a processor. The processor may execute the instructions to detect a position of a person, generate a model of a demonstration area from a viewpoint corresponding to the position of the person, apply a selected digital material to a model surface of the model that corresponds to a demonstration surface of the demonstration area, adjust the model for a demonstration area condition; split the model into split images for projector zones; and provide the split images to projectors that correspond to the projector zones.

In some examples, the processor may detect the position of the person using a radio frequency identification tag. In a number of such examples, the radio frequency identification tag may be coupled to glasses worn by the person.

In various examples, the processor may detect the position of the person using a camera. In some examples, the processor may detect the position of the person using a motion sensor. In a number of examples, the processor may detect the position by receiving an indication of the position via user input.

In some examples, the processor may detect that the person moves to a new position, generate updated split images based on the new position, and provide the updated split images to the projectors that correspond to the projector zones.

In some implementations, a system may include a non-transitory storage medium that stores instructions and a processor. The processor may execute the instructions to detect positions of multiple people, generate versions of a model of a demonstration area from viewpoints corresponding to the positions of the multiple people, apply a selected digital material to a model surface of the versions of the model that corresponds to a demonstration surface of the demonstration area, adjust the versions of the model for a demonstration area condition, split the versions of the model into split images for projector zones, configure the split images to be respectively viewable by the respective person of the multiple people, and provide the split images to projectors that correspond to the projector zones.

In a number of examples, the processor may configure the split images to be respectively viewable by the respective person of the multiple people by polarizing the split images differently for the respective person of the multiple people. In some such examples, the system may further include glasses worn by the respective person of the multiple people that are polarized to match a polarization of the respective split images.

In various examples, the processor may configure the split images to be respectively viewable by the respective person of the multiple people providing the split images in alternating frames. In some such examples, the system may further include glasses worn by the respective person of the multiple people that are polarized to match the frames of the respective split images.

In a number of examples, the processor may apply a different digital material to the model surface of one of the versions of the model. In some examples, the processor may provide different split images corresponding to different versions of the model to different sets of projectors.

In a number of implementations, a system may include a non-transitory storage medium that stores instructions and a processor. The processor may execute the instructions to generate a model of a demonstration area from a viewpoint corresponding to a position of a person, apply a selected digital material to a model surface of the model that corresponds to a demonstration surface of the demonstration area, split the model into split images for projector zones, provide the split images to projectors that correspond to the projector zones, generate updated split images based on a new position of the person, and provide the updated split images to the projectors that correspond to the projector zones.

In various examples, the processor may receive the position of the person. In some examples, the processor detects the new position of the person. In a number of examples, the processor may receive an indication of the selected digital material from the person.

In some examples, the selected digital material may include at least one of a fabric, a flooring, a paint, a wood, a paneling, a stone, a brick, a carpet, a laminate, a countertop, a cabinet, a wallpaper, a molding, a tile, or a houseware. In various examples, the processor may at least one of polarize the split images or alternate frames with the split images and other split images.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to a multi-perspective visualization system. The system may determine one or more positions of one or more people, generate one or more models of one or more demonstration areas from one or more perspectives corresponding to the position, apply one or more digital materials to the model, split the model into split images corresponding to projector zones, and provide the split images to projectors for the respective zones. If there are multiple people with multiple perspectives, the system may generate multiple versions of the model from different perspectives and configure images of the model to be projected in such a way that they are respectively viewable by the respective person that corresponds to the respective perspective from which the respective model was generated.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:
   a non-transitory storage medium that stores instructions; and
   a processor that executes the instructions to:
      detect a position of a person;
      generate a model of a physical demonstration area from a viewpoint corresponding to the position of the person;
      apply a selected digital material to a model surface of the model that corresponds to a physical demonstration surface of the physical demonstration area;
      adjust the model for occurrence of a condition in the physical demonstration area;
      split the model into split images for projector zones; and
      provide the split images to projectors that project into the physical demonstration area and correspond to the projector zones.

2. The system of claim 1, wherein the processor detects the position of the person using a radio frequency identification tag.

3. The system of claim 2, wherein the radio frequency identification tag is coupled to glasses worn by the person.

4. The system of claim 1, wherein the processor detects the position of the person using a camera.

5. The system of claim 1, wherein the processor detects the position of the person using a motion sensor.

6. The system of claim 1, wherein the processor detects the position by receiving an indication of the position via user input.

7. The system of claim 1, wherein the processor:
   detects that the person moves to a new position;
   generates updated split images based on the new position; and
   provides the updated split images to the projectors that correspond to the projector zones.

8. A system, comprising:
   a non-transitory storage medium that stores instructions; and
   a processor that executes the instructions to:
      detect positions of multiple people;

generate versions of a model of a physical demonstration area from viewpoints corresponding to the positions of the multiple people;
      apply a selected digital material to a physical model surface of the versions of the model that corresponds to a physical demonstration surface of the physical demonstration area;
      adjust the versions of the model for occurrence of a condition in the physical demonstration area;
      split the versions of the model into split images for projector zones;
      configure the split images to be respectively viewable by the respective person of the multiple people; and
      provide the split images to projectors that project into the physical demonstration area and correspond to the projector zones.

9. The system of claim 8, wherein the processor configures the split images to be respectively viewable by the respective person of the multiple people by polarizing the split images differently for the respective person of the multiple people.

10. The system of claim 9, further comprising glasses worn by the respective person of the multiple people that are polarized to match a polarization of the respective split images.

11. The system of claim 8, wherein the processor configures the split images to be respectively viewable by the respective person of the multiple people providing the split images in alternating frames.

12. The system of claim 11, further comprising glasses worn by the respective person of the multiple people that are polarized to match the frames of the respective split images.

13. The system of claim 8, wherein the processor applies a different digital material to the model surface of one of the versions of the model.

14. The system of claim 8, wherein the processor provides different split images corresponding to different versions of the model to different sets of projectors.

15. A system, comprising:
   a non-transitory storage medium that stores instructions; and
   a processor that executes the instructions to:
      generate a model of a physical demonstration area from a viewpoint corresponding to a position of a person;
      apply a selected digital material to a physical model surface of the model that corresponds to a demonstration surface of the physical demonstration area;
      split the model into split images for projector zones;
      provide the split images to projectors that correspond to the projector zones;
      generate updated split images based on a new position of the person; and
      provide the updated split images to the projectors that project into the physical demonstration area and correspond to the projector zones.

16. The system of claim 15, wherein the processor receives the position of the person.

17. The system of claim 15, wherein the processor detects the new position of the person.

18. The system of claim 15, wherein the processor receives an indication of the selected digital material from the person.

19. The system of claim 15, wherein the selected digital material comprises at least one of a fabric, a flooring, a paint, a wood, a paneling, a stone, a brick, a carpet, a laminate, a countertop, a cabinet, a wallpaper, a molding, a tile, or a houseware.

20. The system of claim 15, wherein the processor at least one of polarizes the split images or alternates frames with the split images and other split images.

* * * * *